United States Patent
Edge et al.

(10) Patent No.: US 10,547,979 B2
(45) Date of Patent: Jan. 28, 2020

(54) SYSTEMS AND METHODS FOR LOCATING A USER EQUIPMENT USING GENERIC POSITION METHODS FOR A 5G NETWORK

(71) Applicant: QUALCOMM Incorporated, San Diego, CA (US)

(72) Inventors: Stephen William Edge, Escondido, CA (US); Luis Fernando Brisson Lopes, Swindon (GB); Sven Fischer, Nuremberg (DE)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/145,546

(22) Filed: Sep. 28, 2018

(65) Prior Publication Data

US 2019/0230475 A1    Jul. 25, 2019

Related U.S. Application Data

(60) Provisional application No. 62/619,909, filed on Jan. 21, 2018.

(51) Int. Cl.
*H04W 4/029*    (2018.01)
*G01S 5/02*    (2010.01)

(52) U.S. Cl.
CPC .......... *H04W 4/029* (2018.02); *G01S 5/0236* (2013.01); *G01S 5/0242* (2013.01)

(58) Field of Classification Search
CPC ..... H04W 4/027; H04W 88/06; H04W 64/00; H04W 12/06; H04W 60/04; H04W 76/10; H04W 8/08; G01S 5/0236
See application file for complete search history.

(56) References Cited

U.S. PATENT DOCUMENTS

2012/0307732 A1* 12/2012 Olsson .................. H04W 64/00
  370/328
2017/0288886 A1* 10/2017 Atarius ............... H04L 12/1407
(Continued)

FOREIGN PATENT DOCUMENTS

EP         2606691 A1    6/2013
WO    WO-2016018512 A1    2/2016

OTHER PUBLICATIONS

Huawei, et al: "Discussion on NR Positioning Technologies," 3GPP Draft; R2-1708210, 3rd Generation Partnership Project (3GPP), Mobile Competence Centre; 650, Route Des Lucioles; F-06921 Sophia-Antipolis Cedex; France, vol. RAN WG2, No. Berlin, Germany; Aug. 21, 2017-Aug. 25, 2017, Aug. 20, 2017, XP051318113, 6 pages, Retrieved from the Internet: URL: http://www.3gpp.org/ftp/Meetings_3GPP_SYNC/RAN2/Docs/ [retrieved on Aug. 20, 2017].

(Continued)

*Primary Examiner* — Diane D Mizrah
(74) *Attorney, Agent, or Firm* — Thien T. Nguyen

(57) ABSTRACT

Techniques are disclosed in which generic position methods in a wireless network allow positioning of a target user equipment (UE) that is served by any one (or more) of a number of different Radio Access Technologies (RATs) and that allow measurements by the UE of access nodes belonging to different RATs and/or measurements of the UE by access nodes for different RATs. With a generic position method, a common set of procedures, messages, and parameters may be defined that are applicable to multiple RATs and that do not require a location server to know in advance the serving RAT for a target UE.

12 Claims, 10 Drawing Sheets

(56) References Cited

U.S. PATENT DOCUMENTS

2017/0332192 A1 11/2017 Edge
2019/0132890 A1* 5/2019 Bollapalli ............. H04W 76/10

OTHER PUBLICATIONS

International Search Report and Written Opinion—PCT/US2018/066275—ISA/EPO—dated Dec. 22, 2019.
Open Mobile Alliance Oma: "Secure User Plane Location Architecture," Jun. 27, 2008, XP055553774, 54 Pages, Retrieved from the Internet: URL: http://www.openmobilealliance.org/release/SUPL/V2_0-20080627-C/OMA-AD-SUPL-V2_0-20080627-C.pdf [retrieved on Feb. 8, 2019].
Qualcomm Incorporated et al: "Evaluation of Conclusions and Completion of TR 23.731," 3GPP Draft; S2-1812094-TR 23.731—Completion of the TR-R3, 3rd Generation Partnership Project (3GPP), Mobile Competence Centre; 650, Route Des Lucioles; F-06921 Sophia-Antipolis Cedex; France, vol. SA WG2, No. West Palm Beach, USA; Nov. 26, 2018-Nov. 30, 2018, Nov. 20, 2018, XP051498830, 5 pages, Retrieved from the Internet: URL: http://www.3gpp.org/ftp/tsg%5Fsa/WG2%5FArch/TSGS2%5F129BIS%5FWest%5FPalm%5FBeach/Docs/S2%2D1812094%2Ezip [retrieved on Nov. 20, 2018.]
Qualcomm Incorporated: "Enhancements to Location Services for CIoT," 3GPP Draft; 29171_CR0037R3_(REL-14)_C4-172205, 3rd Generation Partnership Project (3GPP), Mobile Competence Centre; 650, Route Des Lucioles; F-06921 Sophia-Antipolis Cedex; France, vol. CT WG4, No. Spokane, USA; Apr. 3, 2017-Apr. 7, 2017, Jun. 5, 2017, XP051271754, 17 pages, Retrieved from the Internet: URL: http://www.3gpp.org/ftp/Meetings_3GPP_SYNC/CT/Docs/ [retrieved on Jun. 5, 2017].

* cited by examiner

SYSTEMS AND METHODS FOR LOCATING A USER EQUIPMENT USING GENERIC POSITION METHODS FOR A 5G NETWORK

RELATED APPLICATIONS

This application claims the benefit of U.S. Provisional Application No. 62/619,909, filed Jan. 21, 2018, entitled "GENERIC POSITION METHODS FOR 5G NETWORKS", which is assigned to the assignee hereof, and incorporated herein in its entirety by reference.

BACKGROUND

Obtaining the location of a mobile device that is accessing a wireless network may be useful for many applications including, for example, emergency calls, personal navigation, asset tracking, locating a friend or family member, etc. In Fifth Generation (5G) networks, it is expected that a 5G control plane location solution currently being developed by the Third Generation Partnership Project (3GPP) will support location for different Radio Access Technologies (RATs) (e.g. Long-Term Evolution (LTE), New Radio (NR), WiFi, etc.) and will allow a user equipment (UE) to change RAT before or during a location session. However, this may result in a location server not knowing the current serving RAT for a UE and/or a change in serving RAT by a UE while obtaining location measurements or a location estimate. Neither of these events is fully supported by current control plane location solutions for wireless networks. Enabling location support in a 5G network for a UE with an unknown serving RAT and/or where a UE changes RAT while performing positioning could thus be an advantage.

SUMMARY

Techniques described herein address these and other issues by using generic position methods that allow positioning of a target UE that is served by a number of different RATs and that allow measurements by a UE of access nodes belonging to different RATs and/or measurements of a UE by access nodes for different RATs. With a generic position method, a common set of procedures, messages, and parameters may be defined that are applicable to a number of different RATs and that support different variants of a common generic position method for the different RATs. Besides enabling location support for multiple RATs, such generic position methods may reduce implementation by reusing the same set of procedures, messages, and parameters for multiple RATs.

An example method of locating a user equipment (UE) at a location server in a wireless network, according to the description, comprises sending, to a wireless entity, a first message comprising a request for a first set of location measurements for determining a location of the UE, wherein the first set of location measurements comprises measurements of signals belonging to a plurality of Radio Access Technologies (RATs), the plurality of RATs includes a serving RAT serving the UE, and which RAT, of the plurality of RATs, comprises the serving RAT is unknown to the location server. The method further comprises receiving a second message from the wireless entity, the second message comprising a second set of location measurements for determining the location of the UE, wherein the second set of location measurements comprises a subset of the first set of location measurements, and the second set of location measurements includes measurements of signals belonging to the serving RAT. The method also comprises determining the location of the UE based on the second set of location measurements.

Alternative embodiments of the method may comprise one or more of the following features. The plurality of RATs may comprise a Fifth Generation (5G) New Radio (NR) RAT, a Long Term Evolution (LTE) RAT, an IEEE 802.11 WiFi RAT, a Bluetooth RAT, or some combination thereof. The wireless entity may comprise a first access node for the wireless network for the serving RAT. The first access node may comprise an NR NodeB (gNB) for an NR RAT, a next generation evolved Node B (ng-eNB) for an LTE RAT, a wireless local area network (WLAN) for an IEEE 802.11 WiFi RAT, or a WLAN for a Bluetooth RAT. The first access node may comprise a serving gNB or a serving ng-eNB for the UE. The first message and the second message may comprise messages for an NR Positioning Protocol A (NRPPa). The second set of location measurements may comprise location measurements, obtained by the first access node, of signals transmitted by the UE using the serving RAT. The location measurements obtained by the first access node may comprise at least one of a Received Signal Strength Indication (RSSI), Reference Signal Received Power (RSRP), Reference Signal Received Quality (RSRQ), Round Trip signal propagation Time (RTT), Angle Of Arrival (AOA), Receive-Transmit Time Difference (Rx-Tx), or some combination thereof. The second set of location measurements may comprise location measurements, obtained by the UE, of signals transmitted by the first access node using the serving RAT, and the location measurements obtained by the UE may be sent to the first access node by the UE. The location measurements obtained by the UE may comprise at least one of a Received Signal Strength Indication (RSSI), Reference Signal Received Power (RSRP), Reference Signal Received Quality (RSRQ), Round Trip signal propagation Time (RTT), Angle Of Arrival (AOA), Angle of Departure (AoD), Receive-Transmit Time Difference (Rx-Tx), or some combination thereof. The second set of location measurements may comprise location measurements, obtained by the UE, of signals transmitted by a second access node using at least one of the plurality of RATs, the second access node may be different than the first access node, and the location measurements obtained by the UE may be sent to the first access node by the UE. The at least one of the plurality of RATs may be different than the serving RAT. The wireless entity may comprise the UE. The first message and the second message may comprise messages for an LTE Positioning Protocol (LPP), an NR Positioning Protocol (NPP), or both. The second set of location measurements may comprise location measurements, obtained by the UE, of signals transmitted by a first access node using the serving RAT. The location measurements obtained by the UE may comprise at least one of a Received Signal Strength Indication (RSSI), Reference Signal Received Power (RSRP), Reference Signal Received Quality (RSRQ), Round Trip signal propagation Time (RTT), Angle Of Arrival (AOA), Angle of Departure (AoD), Receive-Transmit Time Difference (Rx-Tx), Reference Signal Time Difference (RSTD), Time Of Arrival (TOA), or some combination thereof. The first access node may comprise an NR NodeB (gNB) for an NR RAT, a next generation evolved Node B (ng-eNB) for an LTE RAT, a wireless local area network (WLAN) for an IEEE 802.11 WiFi RAT, or a WLAN for a Bluetooth RAT. The first access node may comprise a serving gNB or a serving ng-eNB for the UE. The second set of location measurements may comprise location measurements, obtained by the UE, of signals transmitted by a plurality of access nodes using the serving RAT. The location measurements obtained by the UE may comprise at least one of a Time Of Arrival (TOA), a Reference Signal Time Difference (RSTD), or some combination thereof. The second set of location measurements may comprise location measurements, obtained by the UE, of signals transmitted by a plurality of access nodes using at least one of the plurality of RATs, wherein the at least one of the plurality of RATs is different than the serving RAT.

An example method of locating a UE at an access node for a wireless network, according to the description, comprises receiving, from a location server in the wireless network, a first message comprising a request for a first set of location measurements for determining a location of the UE, wherein the first set of location measurements comprises measurements of signals belonging to a plurality of Radio Access Technologies (RATs), the plurality of RATs comprise a serving RAT serving the UE, which RAT, of the plurality of RATs, comprises the serving RAT is unknown to the location server, and the access node is an access node of the serving RAT. The method further comprises obtaining a second set of location measurements for determining the location of the UE, wherein the second set of location measurements comprises a subset of the first set of location measurements, and the second set of location measurements includes measurements of signals belonging to the serving RAT. The method also comprises sending a second message to the location server, the second message comprising the second set of location measurements.

Alternative embodiments of the method may include one or more of the following features. The plurality of RATs may comprise a Fifth Generation (5G) New Radio (NR) RAT, a Long Term Evolution (LTE) RAT, an IEEE 802.11 WiFi RAT, a Bluetooth RAT, or some combination thereof. The access node may comprise an NR NodeB (gNB) for an NR RAT, a next generation evolved Node B (ng-eNB) for an LTE RAT, a wireless local area network (WLAN) for an IEEE 802.11 WiFi RAT, a WLAN for a Bluetooth RAT, or a Non-3GPP Interworking Function. The access node may be a serving gNB or a serving ng-eNB for the UE. The first message and the second message may comprise messages for an NR Positioning Protocol A (NRPPa). Obtaining the second set of location measurements may comprise obtaining a third set of location measurements of signals for the serving RAT transmitted by the UE, and including, in the second set of location measurements, the third set of location measurements. The third set of location measurements may comprise at least one of a Received Signal Strength Indication (RSSI), Reference Signal Received Power (RSRP), Reference Signal Received Quality (RSRQ), Round Trip signal propagation Time (RTT), Angle Of Arrival (AOA), Receive-Transmit time difference (Rx-Tx), or some combination thereof. The second set of location measurements may comprise receiving, at the access node, location measurements, obtained by the UE, of signals transmitted by at least one access node using at least one of the plurality of RATs, and including, in the second set of location measurements, the location measurements obtained by the UE. The at least one access node may comprise the access node and the at least one of the plurality of RATs comprises the serving RAT. The at least one access node does not comprise the access node. The at least one of the plurality of RATs may not comprise the serving RAT. The method may further comprise sending, to the UE, a request for the location measurements obtained by the UE, wherein the receiving the location measurements obtained by the UE is in response to the sending the request for the location measurements obtained by the UE. The location measurements obtained by the UE may comprise at least one of a Received Signal Strength Indication (RSSI), Reference Signal Received Power (RSRP), Reference Signal Received Quality (RSRQ), Round Trip signal propagation Time (RTT), Angle Of Arrival (AOA), Angle of Departure (AoD), Receive-Transmit time difference (Rx-Tx), Reference Signal Time Difference (RSTD), Time Of Arrival (TOA), or some combination thereof.

An example method, at a UE accessing a wireless network of locating the UE, according to the description, comprises receiving, from a location server in the wireless network, a first message comprising a request for a first set of location measurements for determining a location of the UE, wherein the first set of location measurements comprises measurements of signals belonging to a plurality of Radio Access Technologies (RATs), the plurality of RATs includes a serving RAT serving the UE, and which RAT, of the plurality of RATs, comprises the serving RAT is unknown to the location server. The method further comprises obtaining a second set of location measurements for determining the location of the UE, wherein the second set of location measurements comprise a subset of the first set of location measurements, and the second set of location measurements includes measurements of signals belonging to the serving RAT. The method also comprises sending a second message to the location server, the second message comprising the second set of location measurements.

Alternative embodiments of the method may include one or more of the following features. The plurality of RATs may comprise a Fifth Generation (5G) New Radio (NR) RAT, a Long Term Evolution (LTE) RAT, an IEEE 802.11 WiFi RAT, a Bluetooth RAT, or some combination thereof. The first message and the second message may comprise messages for an LTE Positioning Protocol (LPP), an NR Positioning Protocol (NPP), or both. Obtaining the second set of location measurements may comprise obtaining a third set of location measurements of signals transmitted by at least one access node using at least one of the plurality of RATs, and including, in the second set of location measurements, the third set of location measurements. The third set of location measurements may comprise at least one of a Received Signal Strength Indication (RSSI), Reference Signal Received Power (RSRP), Reference Signal Received Quality (RSRQ), Round Trip signal propagation Time (RTT), Angle Of Arrival (AOA), Angle of Departure (AOD), Receive-Transmit time difference (Rx-Tx), Reference Signal Time Difference (RSTD), Time of Arrival (TOA), or some combination thereof. The at least one access node may comprise an NR NodeB (gNB) for an NR RAT, a next generation evolved Node B (ng-eNB) for an LTE RAT, a wireless local area network (WLAN) for an IEEE 802.11 WiFi RAT, or a WLAN for a Bluetooth RAT. The at least one of the plurality of RATs may comprise the serving RAT. The at least one access node comprises a serving gNB or a serving ng-eNB for the UE. The at least one of the plurality of RATs may be different than the serving RAT.

An example server for locating a UE in a wireless network, according to the description, comprises a communication interface, a memory, and one or more processing units communicatively coupled with the memory and the communication interface. The one or more processing units are configured to cause the server to send, via the communication interface to a wireless entity, a first message comprising a request for a first set of location measurements for determining a location of the UE. The first set of location measurements comprises measurements of signals belonging to a plurality of Radio Access Technologies (RATs), the plurality of RATs includes a serving RAT serving the UE, and which RAT, of the plurality of RATs, comprises the serving RAT is unknown to the server. The one or more processing units are further configured to cause the server to receive, via the communication interface, a second message from the wireless entity, the second message comprising a second set of location measurements for determining the location of the UE. The second set of location measurements comprises a subset of the first set of location measurements, and the second set of location measurements includes measurements of signals belonging to the serving RAT. The one or more processing units are also configured to cause the server to determine the location of the UE based on the second set of location measurements.

Alternative embodiments of the server also may include one or more of the following features. The plurality of RATs may comprise a Fifth Generation (5G) New Radio (NR) RAT, a Long Term Evolution (LTE) RAT, an IEEE 802.11 WiFi RAT, a Bluetooth RAT, or some combination thereof. The wireless entity may comprise a first access node for the wireless network for the serving RAT. The first access node may comprise an NR NodeB (gNB) for an NR RAT, a next generation evolved Node B (ng-eNB) for an LTE RAT, a wireless local area network (WLAN) for an IEEE 802.11 WiFi RAT, or a WLAN for a Bluetooth RAT. The first access node may comprise a serving gNB or a serving ng-eNB for the UE. The first message and the second message may comprise messages for an NR Positioning Protocol A (NRPPa). The second set of location measurements may comprise location measurements, obtained by the first access node, of signals transmitted by the UE using the serving RAT. The second set of location measurements may comprise location measurements, obtained by the UE, of signals transmitted by the first access node using the serving RAT, and the location measurements obtained by the UE may be sent to the first access node by the UE. The second set of location measurements may comprise location measurements, obtained by the UE, of signals transmitted by a second access node using at least one of the plurality of RATs, The second access node may be different than the first access node, and the location measurements obtained by the UE may be sent to the first access node by the UE. The at least one of the plurality of RATs may be different than the serving RAT. The wireless entity may comprise the UE. The first message and the second message may comprise messages for an LTE Positioning Protocol (LPP), an NR Positioning Protocol (NPP), or both. The second set of location measurements may comprise location measurements, obtained by the UE, of signals transmitted by a first access node using the serving RAT. The location measurements obtained by the UE may comprise at least one of a Received Signal Strength Indication (RSSI), Reference Signal Received Power (RSRP), Reference Signal Received Quality (RSRQ), Round Trip signal propagation Time (RTT), Angle Of Arrival (AOA), Angle of Departure (AoD), Receive-Transmit Time Difference (Rx-Tx), Reference Signal Time Difference (RSTD), Time Of Arrival (TOA), or some combination thereof. The first access node may comprise an NR NodeB (gNB) for an NR RAT, a next generation evolved Node B (ng-eNB) for an LTE RAT, a wireless local area network (WLAN) for an IEEE 802.11 WiFi RAT, or a WLAN for a Bluetooth RAT. The first access node may comprise a serving gNB or a serving ng-eNB for the UE. The second set of location measurements may comprise location measurements, obtained by the UE, of signals transmitted by a plurality of access nodes using the serving RAT. The location measurements obtained by the UE comprise at least one of a Time Of Arrival (TOA), a Reference Signal Time Difference (RSTD), or some combination thereof. The second set of location measurements may comprise location measurements, obtained by the UE, of signals transmitted by a plurality of access nodes using at least one of the plurality of RATs, wherein the at least one of the plurality of RATs is different than the serving RAT.

An example access node for locating a user equipment (UE) in a wireless network, according to the description, comprises a communication interface, a memory, and one or more processing units communicatively coupled with the memory and the communication interface. The one or more processing units are configured to cause the access node to receive, via the communication interface from a location server in the wireless network, a first message comprising a request for a first set of location measurements for determining a location of the UE. The first set of location measurements comprises measurements of signals belonging to a plurality of Radio Access Technologies (RATs), the plurality of RATs comprise a serving RAT serving the UE, which RAT, of the plurality of RATs, comprises the serving RAT is unknown to the location server, and the access node is an access node of the serving RAT. The one or more processing units are further configured to cause the access node to obtain a second set of location measurements for determining the location of the UE, wherein the second set of location measurements comprises a subset of the first set of location measurements, and the second set of location measurements includes measurements of signals belonging to the serving RAT. The one or more processing units are also configured to cause the access node to send a second message to the location server via the communication interface, the second message comprising the second set of location measurements.

Alternative embodiments of the access node also may comprise one or more of the following features. The plurality of RATs may comprise a Fifth Generation (5G) New Radio (NR) RAT, a Long Term Evolution (LTE) RAT, an IEEE 802.11 WiFi RAT, a Bluetooth RAT, or some combination thereof. The access node may comprise an NR NodeB (gNB) for an NR RAT, a next generation evolved Node B (ng-eNB) for an LTE RAT, a wireless local area network (WLAN) for an IEEE 802.11 WiFi RAT, a WLAN for a Bluetooth RAT, or a Non-3GPP Interworking Function. The access node may be a serving gNB or a serving ng-eNB for the UE. The first message and the second message may comprise messages for an NR Positioning Protocol A (NRPPa). The one or more processing units may be configured to cause the access node to obtain the second set of location measurements at least in part by obtaining a third set of location measurements of signals for the serving RAT transmitted by the UE, and including, in the second set of location measurements, the third set of location measurements. The third set of location measurements may comprise at least one of a Received Signal Strength Indication (RSSI), Reference Signal Received Power (RSRP), Reference Signal Received Quality (RSRQ), Round Trip signal propagation Time (RTT), Angle Of Arrival (AOA), Receive-Transmit time difference (Rx-Tx), or some combination thereof. The one or more processing units may be configured to cause the access node to obtain the second set of location measurements comprises at least in part by receiving, at the access node, location measurements, obtained by the UE, of signals transmitted by at least one access node using at least one of the plurality of RATs, and including, in the second set of location measurements, the location measurements obtained by the UE. The at least one access node may comprise the access node and the at least one of the plurality of RATs comprises the serving RAT. The at least one access node may not comprise the access node. The at least one of the plurality of RATs may not comprise the serving RAT. The one or more processing units may be further configured to cause the access node to send, to the UE, a request for the location measurements obtained by the UE, wherein the receiving the location measurements obtained by the UE is in response to the sending the request for the location measurements obtained by the UE. The location measurements obtained by the UE comprise at least one of a Received Signal Strength Indication (RSSI), Reference Signal Received Power (RSRP), Reference Signal Received Quality (RSRQ), Round Trip signal propagation Time (RTT), Angle Of Arrival (AOA), Angle of Departure (AoD), Receive-Transmit time difference (Rx-Tx), Reference Signal Time Difference (RSTD), Time Of Arrival (TOA), or some combination thereof.

An example UE, according to the disclosure, comprises a wireless communication interface, a memory, and one or more processing units communicatively coupled with the memory and the communication interface. The one or more processing units may be configured to cause the UE to receive, via the wireless communication interface from a location server in a wireless network, a first message comprising a request for a first set of location measurements for determining a location of the UE. The first set of location measurements comprises measurements of signals belonging to a plurality of Radio Access Technologies (RATs), the plurality of RATs includes a serving RAT serving the UE, and which RAT, of the plurality of RATs, comprises the serving RAT is unknown to the location server. The one or more processing units further may be configured to cause the UE to obtain a second set of location measurements for determining the location of the UE. The second set of location measurements comprise a subset of the first set of location measurements, and the second set of location measurements includes measurements of signals belonging to the serving RAT. The one or more processing units further may be configured to cause the UE to send a second message to the location server via the wireless communication interface, the second message comprising the second set of location measurements.

Alternative embodiments of the UE also may include one or more of the following features. The plurality of RATs may comprise a Fifth Generation (5G) New Radio (NR) RAT, a Long Term Evolution (LTE) RAT, an IEEE 802.11 WiFi RAT, a Bluetooth RAT, or some combination thereof. The first message and the second message may comprise messages for an LTE Positioning Protocol (LPP), an NR Positioning Protocol (NPP), or both. The one or more processing units may be configured to cause the UE to obtain the second set of location measurements at least in part by obtaining a third set of location measurements of signals transmitted by at least one access node using at least one of the plurality of RATs, and including, in the second set of location measurements, the third set of location measurements. The third set of location measurements may comprise at least one of a Received Signal Strength Indication (RSSI), Reference Signal Received Power (RSRP), Reference Signal Received Quality (RSRQ), Round Trip signal propagation Time (RTT), Angle Of Arrival (AOA), Angle of Departure (AOD), Receive-Transmit time difference (Rx-Tx), Reference Signal Time Difference (RSTD), Time of Arrival (TOA), or some combination thereof. The at least one access node may comprise an NR NodeB (gNB) for an NR RAT, a next generation evolved Node B (ng-eNB) for an LTE RAT, a wireless local area network (WLAN) for an IEEE 802.11 WiFi RAT, or a WLAN for a Bluetooth RAT. The at least one of the plurality of RATs may comprise the serving RAT. The at least one access node may comprise a serving gNB or a serving ng-eNB for the UE. The at least one of the plurality of RATs may be different than the serving RAT.

Another example device for locating a UE, according to the description, comprises means for sending, to a wireless entity, a first message comprising a request for a first set of location measurements for determining a location of the UE, where the first set of location measurements comprises measurements of signals belonging to a plurality of Radio Access Technologies (RATs), the plurality of RATs includes a serving RAT serving the UE, and which RAT, of the plurality of RATs, comprises the serving RAT is unknown to the device. The example device further comprises means for receiving a second message from the wireless entity, the second message comprising a second set of location measurements for determining the location of the UE, where the second set of location measurements comprises a subset of the first set of location measurements, and the second set of location measurements includes measurements of signals belonging to the serving RAT. The example device also comprises means for determining the location of the UE based on the second set of location measurements.

Alternative embodiments of the device also may include one or more the following features. The plurality of RATs may comprise a Fifth Generation (5G) New Radio (NR) RAT, a Long Term Evolution (LTE) RAT, an IEEE 802.11 WiFi RAT, a Bluetooth RAT, or some combination thereof. The wireless entity may comprise a first access node for a wireless network for the serving RAT. The first access node may comprise an NR NodeB (gNB) for an NR RAT, a next generation evolved Node B (ng-eNB) for an LTE RAT, a wireless local area network (WLAN) for an IEEE 802.11 WiFi RAT, or a WLAN for a Bluetooth RAT. The first access node may comprise a serving gNB or a serving ng-eNB for the UE. The first message and the second message may comprise messages for an NR Positioning Protocol A (NRPPa). The second set of location measurements may comprise location measurements, obtained by the first access node, of signals transmitted by the UE using the serving RAT. The location measurements obtained by the first access node may comprise at least one of a Received Signal Strength Indication (RSSI), Reference Signal Received Power (RSRP), Reference Signal Received Quality (RSRQ), Round Trip signal propagation Time (RTT), Angle Of Arrival (AOA), Receive-Transmit Time Difference (Rx-Tx), or some combination thereof. The second set of location measurements may comprise location measurements, obtained by the UE, of signals transmitted by the first access node using the serving RAT, and the location measurements obtained by the UE may be sent to the first access node by the UE. The location measurements obtained by the UE may comprise at least one of a Received Signal Strength Indication (RSSI), Reference Signal Received Power (RSRP), Reference Signal Received Quality (RSRQ), Round Trip signal propagation Time (RTT), Angle Of Arrival (AOA), Angle of Departure (AoD), Receive-Transmit Time Difference (Rx-Tx), or some combination thereof. The second set of location measurements comprise location measurements, obtained by the UE, of signals transmitted by a second access node using at least one of the plurality of RATs, The second access node may be different than the first access node, and the location measurements obtained by the UE may be sent to the first access node by the UE. The at least one of the plurality of RATs may be different than the serving RAT. The wireless entity may comprise the UE. The first message and the second message may comprise messages for an LTE Positioning Protocol (LPP), an NR Positioning Protocol (NPP), or both. The second set of location measurements may comprise location measurements, obtained by the UE, of signals transmitted by a first access node using the serving RAT. The location measurements obtained by the UE may comprise at least one of a Received Signal Strength Indication (RSSI), Reference Signal Received Power (RSRP), Reference Signal Received Quality (RSRQ), Round Trip signal propagation Time (RTT), Angle Of Arrival (AOA), Angle of Departure (AoD), Receive-Transmit Time Difference (Rx-Tx), Reference Signal Time Difference (RSTD), Time Of Arrival (TOA), or some combination thereof. The first access node may comprise an NR NodeB (gNB) for an NR RAT, a next generation evolved Node B (ng-eNB) for an LTE RAT, a wireless local area network (WLAN) for an IEEE 802.11 WiFi RAT, or a WLAN for a Bluetooth RAT. The first access node may comprise a serving gNB or a serving ng-eNB for the UE. The second set of location measurements may comprise location measurements, obtained by the UE, of signals transmitted by a plurality of access nodes using the serving RAT. The location measurements obtained by the UE may comprise at least one of a Time Of Arrival (TOA), a Reference Signal Time Difference (RSTD), or some combination thereof. The second set of location measurements may comprise location measurements, obtained by the UE, of signals transmitted by a plurality of access nodes using at least one of the plurality of RATs, wherein the at least one of the plurality of RATs is different than the serving RAT.

Another example device for locating a user equipment UE, according to the description, comprises means for receiving, from a location server in a wireless network, a first message comprising a request for a first set of location measurements for determining a location of the UE, where the first set of location measurements comprises measurements of signals belonging to a plurality of Radio Access Technologies (RATs), the plurality of RATs comprise a serving RAT serving the UE, which RAT, of the plurality of RATs, comprises the serving RAT is unknown to the location server, and the device is an access node of the serving RAT. The device further comprises means for obtaining a second set of location measurements for determining the location of the UE, where the second set of location measurements comprises a subset of the first set of location measurements, and the second set of location measurements includes measurements of signals belonging to the serving RAT. The device also comprises means for sending a second message to the location server, the second message comprising the second set of location measurements.

Alternative embodiments of the device also may comprise one or more of the following features. The plurality of RATs may comprise a Fifth Generation (5G) New Radio (NR) RAT, a Long Term Evolution (LTE) RAT, an IEEE 802.11 WiFi RAT, a Bluetooth RAT, or some combination thereof. The device may comprise an NR NodeB (gNB) for an NR RAT, a next generation evolved Node B (ng-eNB) for an LTE RAT, a wireless local area network (WLAN) for an IEEE 802.11 WiFi RAT, a WLAN for a Bluetooth RAT, or a Non-3GPP Interworking Function. The device may be a serving gNB or a serving ng-eNB for the UE. The first message and the second message may comprise messages for an NR Positioning Protocol A (NRPPa). The means for obtaining the second set of location measurements may comprise means for obtaining a third set of location measurements of signals for the serving RAT transmitted by the UE, and means for including, in the second set of location measurements, the third set of location measurements. The third set of location measurements may comprise at least one of a Received Signal Strength Indication (RSSI), Reference Signal Received Power (RSRP), Reference Signal Received Quality (RSRQ), Round Trip signal propagation Time (RTT), Angle Of Arrival (AOA), Receive-Transmit time difference (Rx-Tx), or some combination thereof. The means for obtaining the second set of location measurements may comprise means for receiving, at the device, location measurements, obtained by the UE, of signals transmitted by at least one access node using at least one of the plurality of RATs, and means for including, in the second set of location measurements, the location measurements obtained by the UE. The at least one access node comprises the device and the at least one of the plurality of RATs may comprise the serving RAT. The at least one access node does not comprise the device. The at least one of the plurality of RATs may not comprise the serving RAT. The device may further comprise means for sending, to the UE, a request for the location measurements obtained by the UE, wherein the receiving the location measurements obtained by the UE is in response to the sending the request for the location measurements obtained by the UE. The location measurements obtained by the UE may comprise at least one of a Received Signal Strength Indication (RSSI), Reference Signal Received Power (RSRP), Reference Signal Received Quality (RSRQ), Round Trip signal propagation Time (RTT), Angle Of Arrival (AOA), Angle of Departure (AoD), Receive-Transmit time difference (Rx-Tx), Reference Signal Time Difference (RSTD), Time Of Arrival (TOA), or some combination thereof.

Another example UE, according to the description, comprises means for receiving, from a location server in a wireless network, a first message comprising a request for a first set of location measurements for determining a location of the UE, where the first set of location measurements comprises measurements of signals belonging to a plurality of Radio Access Technologies (RATs), the plurality of RATs includes a serving RAT serving the UE, and which RAT, of the plurality of RATs, comprises the serving RAT is unknown to the location server. The UE further comprises means for obtaining a second set of location measurements for determining the location of the UE, where the second set of location measurements comprise a subset of the first set of location measurements, and the second set of location measurements includes measurements of signals belonging to the serving RAT. The UE further comprises means for sending a second message to the location server, the second message comprising the second set of location measurements.

Alternative embodiments of the UE also may include one or more the following features. The plurality of RATs may comprise a Fifth Generation (5G) New Radio (NR) RAT, a Long Term Evolution (LTE) RAT, an IEEE 802.11 WiFi RAT, a Bluetooth RAT, or some combination thereof. The first message and the second message may comprise messages for an LTE Positioning Protocol (LPP), an NR Positioning Protocol (NPP), or both. The means for obtaining the second set of location measurements may comprise means for obtaining a third set of location measurements of signals transmitted by at least one access node using at least one of the plurality of RATs, and means for including, in the second set of location measurements, the third set of location measurements. The third set of location measurements may comprise at least one of a Received Signal Strength Indication (RSSI), Reference Signal Received Power (RSRP), Reference Signal Received Quality (RSRQ), Round Trip signal propagation Time (RTT), Angle Of Arrival (AOA), Angle of Departure (AOD), Receive-Transmit time difference (Rx-Tx), Reference Signal Time Difference (RSTD), Time of Arrival (TOA), or some combination thereof. The at least one access node may comprise an NR NodeB (gNB) for an NR RAT, a next generation evolved Node B (ng-eNB) for an LTE RAT, a wireless local area network (WLAN) for an IEEE 802.11 WiFi RAT, or a WLAN for a Bluetooth RAT. The at least one of the plurality of RATs may comprise the serving RAT. The at least one access node may comprise a serving gNB or a serving ng-eNB for the UE. The at least one of the plurality of RATs may be different than the serving RAT.

Figure 1:
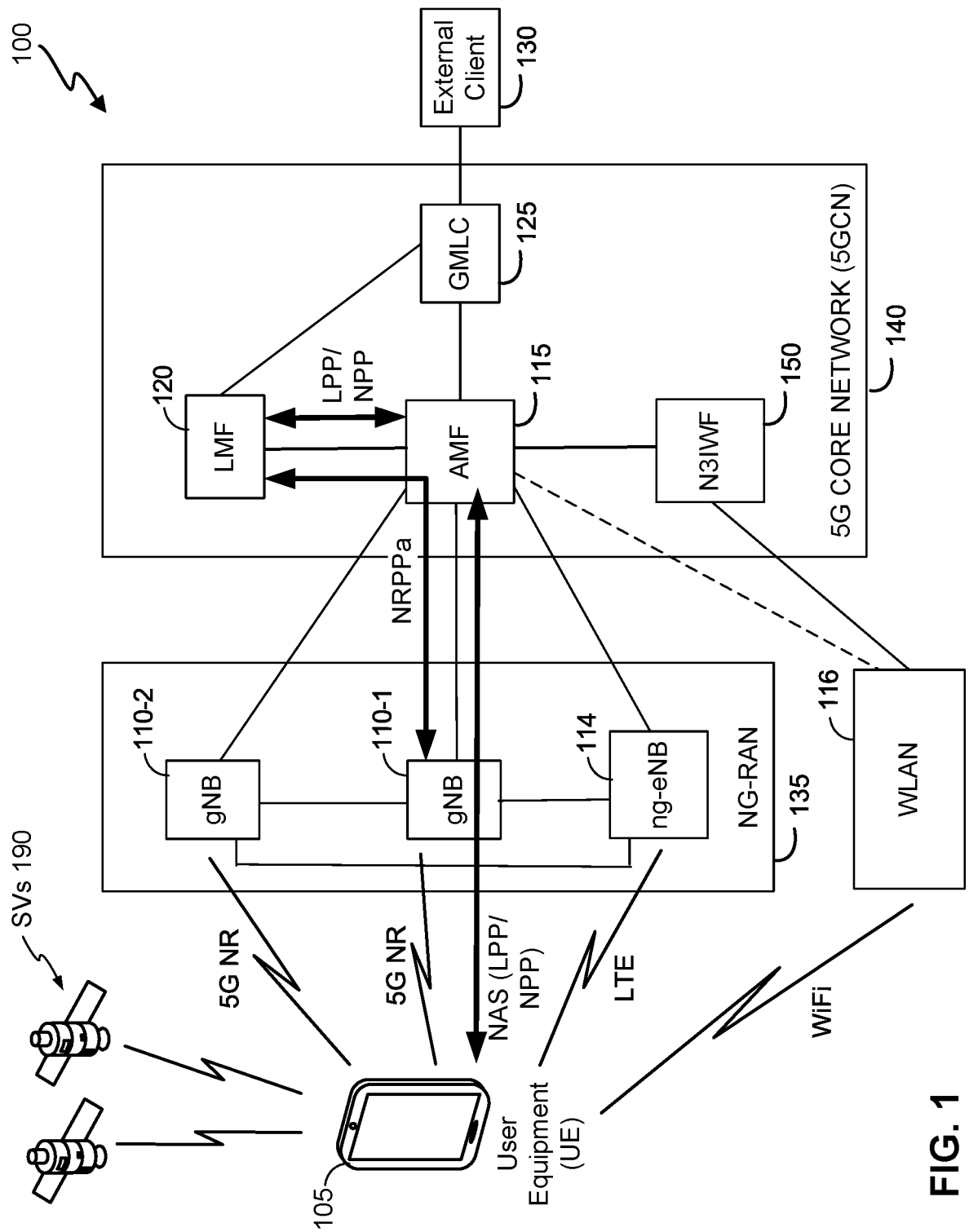
FIG. 1 is a diagram of an example communication system that may utilize a 5G network to determine a position for a mobile device, according to an embodiment.

Like reference symbols in the various drawings indicate like elements, in accordance with certain example implementations. In addition, multiple instances of an element may be indicated by following a first number for the element with a letter or a hyphen and a second number. For example, multiple instances of an element 110 may be indicated as 110-1, 110-2, 110-3 etc. or as 110a, 110b, 110c etc. When referring to such an element using only the first number, any instance of the element is to be understood (e.g. element 110 in the previous example would refer to elements 110-1, 110-2 and 110-3 or to elements 110a, 110b and 110c).

DETAILED DESCRIPTION

Obtaining the location of a mobile device that is accessing a wireless network may be useful for many applications including, for example, emergency calls, personal navigation, asset tracking, locating a friend or family member, etc. In 5G networks, it will be possible for a UE to move between different access types via handover, cell change or RAT change while still accessing the same serving Access and Mobility Management Function (AMF) in a 5G Core Network (5GCN). The access types currently defined by 3GPP for a 5GCN comprise New Radio (NR) supported by NR NodeBs, also referred to as gNBs, LTE or evolved LTE (eLTE) supported by next-generation evolved Node Bs (ng-eNBs) and WiFi® (also referred to as Wi-Fi) supported by untrusted or trusted Wireless Local Area Networks (WLANs). But in future there may be other access types (e.g. Bluetooth®). The ability to preserve the same serving AMF may allow a 5G control plane location solution to support location for different RATs (e.g. LTE, NR, WiFi) and may allow a UE to change RAT during a location session. However, this may also mean that a location server in a 5GCN (e.g. a Location Management Function (LMF)) may not know the current serving RAT for a UE and/or that a UE may change serving RAT during a positioning procedure. Neither of these events can be fully supported by the control plane location solution defined in 3GPP Technical Specification (TS) 23.271 for Long Term Evolution (LTE) access by a UE and, instead, a location server (e.g. an Enhanced Serving Mobile Location Center (E-SMLC)) may need to restart a location session or abandon it. Enabling full location support in a 5GCN for a UE with an unknown serving RAT and/or where a UE changes RAT during a location session could thus be an advantage.

Embodiments described herein provide for common (or generic) positioning procedures for 5G that support multiple RATs. For example, a generic network based enhanced cell ID (ECID) procedure could be supported by the NR Positioning Protocol A (NRPPa), defined in 3GPP TS 38.455, that is (or may be) applicable to NR access at a serving gNB, LTE access at a serving ng-eNB and WiFi access at a serving trusted or untrusted WLAN. Similarly, a generic UE assisted/UE based Observed Time Difference of Arrival (OTDOA) procedure could be supported by the LTE Positioning Protocol (LPP) (or a future New Radio Positioning Protocol, which may be referred to as an NPP or NRPP protocol) that is applicable to a UE with a serving gNB, serving ng-eNB or serving WLAN and that allows neighbor and reference cells for OTDOA to be associated with a mixture of gNBs, ng-eNBs and evolved Node Bs (eNBs). These generic procedures could use a common set of messages and parameters that could enable support by access nodes for different RATs in the case of network based positioning using NRPPa and by UEs with different serving RATs in the case of UE assisted and UE based positioning using LPP or NPP.

As used herein, the term "unknown," in the context of a UE having an "unknown" serving RAT, a serving RAT "unknown" to a location server, or a similar description, means a location server does not have information identifying which RAT (e.g., of a plurality of RATs that may potentially function as the serving RAT for the UE) is the current serving RAT for a UE. A person of ordinary skill in the art will appreciate such scenarios can occur in various circumstances.

In current positioning protocols like the LTE Positioning Protocol (LPP) defined in 3GPP TS 36.355, the LPP Extensions (LPPe) protocol defined by the Open Mobile Alliance (OMA) and the LPP A (LPPa) protocol defined in 3GPP TS 36.455, it is normal to define different position methods, with distinct associated procedures, messages and parameters, to support terrestrial positioning for different RATs. For example, in the case of UE assisted ECID, LPP and LPPe support different ECID position methods for Global System for Mobile communication (GSM) access, Universal Mobile Telecommunications System (UMTS) access, LTE access and WiFi access. In each case, a particular position method would support positioning (e.g. using ECID) for just one RAT (e.g. GSM, UMTS or LTE) but would not support positioning for a UE for two or more RATs. This means that a location server (e.g. an E-SMLC or a Secure User Plane Location (SUPL) Location Platform (SLP)) has to know which RAT a UE is accessing in order to invoke the correct corresponding type of ECID position method. The same applies to support of OTDOA where different position methods exist for GSM access (known as Enhanced Observed Time Difference (E-OTD)), UMTS access (known as OTDOA) and LTE access (also known as OTDOA but different to OTDOA for UMTS). Again, a location server (e.g. E-SMLC or SLP) needs to know the RAT a UE is accessing in order to invoke the correct OTDOA position method, assign appropriate reference and neighbor cells and provide corresponding assistance data to a UE for OTDOA measurements by the UE. However, for access by a UE to a 5GCN, a location server (e.g. an LMF) will typically not know the serving RAT for a UE except possibly at the start of a location session. In addition, some 5G networks may employ a mixture of ng-eNBs, gNBs, and/or WLANs in the same local area, but only a portion of these may be usable for positioning of a UE by a positioning method that was restricted to a single RAT only.

According to embodiments, these problems may be overcome by using generic position methods that allow positioning of a target UE that is served by any one (or more) of a number of different RATs and that allow measurements by a UE of access nodes belonging to different RATs and/or measurements of a UE by access nodes for different RATs. With a generic position method, a common set of procedures, messages and parameters may be defined that are applicable to a number of different RATs and that support different variants of a common generic position method for the different RATs. Besides enabling location support for multiple RATs, such generic position methods may reduce implementation by reusing the same set of procedures, message and parameters for multiple RATs. Some particular examples of this are described below.

While transmission of a Positioning Reference Signal (PRS) to support location of mobile devices is described herein, transmission of other types of signal such as a Cell-specific Reference Signal (CRS) or Tracking Reference Signal (TRS) may be used instead for some wireless technologies (e.g. such as 5G NR). Consequently, methods exemplified herein to support location measurements for PRS transmission may be equally applicable to transmission of other signals used for positioning such as a CRS or TRS.

FIG. 1 shows a diagram of a communication system 100, according to an embodiment. The communication system 100 may be configured to determine the location of a UE 105 by using access nodes 110, 114, 116 and/or a location server (LMF 120) to implement one or more positioning methods. Here, the communication system 100 comprises a UE 105, and components of a 5G network comprising a Next Generation (NG) Radio Access Network (RAN) (NG-RAN) 135 and a 5G Core Network (5GCN) 140. A 5G network may also be referred to as an NR network; NG-RAN 135 may be referred to as a 5G RAN or as an NR RAN; and 5GCN 140 may be referred to as an NG Core network. Standardization of an NG-RAN and 5GCN is ongoing in 3GPP. Accordingly, NG-RAN 135 and 5GCN 140 may conform to current or future standards for 5G support from 3GPP. The communication system 100 may further utilize information from space vehicles (SVs) 190 for a Global Navigation Satellite System (GNSS) like GPS, GLONASS, Galileo or Beidou or some other local or regional Satellite Positioning System (SPS) such as IRNSS, European Geostationary Navigation Overlay Service (EGNOS) or Wide Area Augmentation System (WAAS). Additional components of the communication system 100 are described below. The communication system 100 may include additional or alternative components.

It should be noted that FIG. 1 provides only a generalized illustration of various components, any or all of which may be utilized as appropriate, and each of which may be duplicated or omitted as necessary. Specifically, although only one UE 105 is illustrated, it will be understood that many UEs (e.g., hundreds, thousands, millions, etc.) may utilize the communication system 100. Similarly, the communication system 100 may include a larger (or smaller) number of SVs 190, gNBs 110, ng-eNBs 114, WLANs 116, AMFs 115, external clients 130, and/or other components. The illustrated connections that connect the various components in the communication system 100 include data and signaling connections which may include additional (intermediary) components, direct or indirect physical and/or wireless connections, and/or additional networks. Furthermore, components may be rearranged, combined, separated, substituted, and/or omitted, depending on desired functionality.

The UE 105 may comprise and/or be referred to as a device, a mobile device, a wireless device, a mobile terminal, a terminal, a mobile station (MS), a SUPL-Enabled Terminal (SET), or by some other name. Moreover, UE 105 may correspond to a cellphone, smartphone, laptop, tablet, personal data assistant (PDA), tracking device, navigation device, Internet of Things (IoT) device, or some other portable or moveable device. Typically, though not necessarily, the UE 105 may support wireless communication using one or more RATs such as using GSM, Code Division Multiple Access (CDMA), Wideband CDMA (WCDMA), LTE, High Rate Packet Data (HRPD), IEEE 802.11 WiFi (also referred to as Wi-Fi), Bluetooth (BT), Worldwide Interoperability for Microwave Access (WiMAX), 5G New Radio (NR) (e.g., using the NG-RAN 135 and 5GCN 140), etc. The UE 105 may also support wireless communication using a WLAN which may connect to other networks (e.g. the Internet) using a Digital Subscriber Line (DSL) or packet cable for example. The use of one or more of these RATs may allow the UE 105 to communicate with an external client 130 (e.g. via elements of 5GCN 140 not shown in FIG. 1, or possibly via a Gateway Mobile Location Center (GMLC) 125) and/or allow the external client 130 to receive location information regarding the UE 105 (e.g., via the GMLC 125).

The UE 105 may include a single entity or may include multiple entities such as in a personal area network where a user may employ audio, video and/or data I/O devices and/or body sensors and a separate wireline or wireless modem. An estimate of a location of the UE 105 may be referred to as a location, location estimate, location fix, fix, position, position estimate or position fix, and may be geodetic, thus providing location coordinates for the UE 105 (e.g., latitude and longitude) which may or may not include an altitude component (e.g., height above sea level, height above or depth below ground level, floor level or basement level). Alternatively, a location of the UE 105 may be expressed as a civic location (e.g., as a postal address or the designation of some point or small area in a building such as a particular room or floor). A location of the UE 105 may also be expressed as an area or volume (defined either geodetically or in civic form) within which the UE 105 is expected to be located with some probability or confidence level (e.g., 67%, 95%, etc.) A location of the UE 105 may further be a relative location comprising, for example, a distance and direction or relative X, Y (and Z) coordinates defined relative to some origin at a known location which may be defined geodetically, in civic terms, or by reference to a point, area, or volume indicated on a map, floor plan or building plan. In the description contained herein, the use of the term location may comprise any of these variants unless indicated otherwise. When computing the location of a UE, it is common to solve for local x, y, and possibly z coordinates and then, if needed, convert the local coordinates into absolute ones (e.g. for latitude, longitude and altitude above or below mean sea level).

Base stations (BSs) in the NG-RAN 135 shown in FIG. 1 comprise gNBs, 110-1 and 110-2 (collectively and generically referred to herein as gNBs 110). Pairs of gNBs 110 in NG-RAN 135 may be connected to one another—e.g. directly as shown in FIG. 1 or indirectly via other gNBs 110. Access to the 5G network is provided to UE 105 via wireless communication between the UE 105 and one or more of the gNBs 110, which may provide wireless communications access to the 5GCN 140 on behalf of the UE 105 using 5G NR. 5G NR radio access may also be referred to as NR radio access or as 5G radio access. In FIG. 1, the serving gNB for UE 105 is assumed to be gNB 110-1, although other gNBs (e.g. gNB 110-2) may act as a serving gNB if UE 105 moves to another location or may act as a secondary gNB to provide additional throughout and bandwidth to UE 105.

Base stations (BSs) in the NG-RAN 135 shown in FIG. 1 may also or instead include a next generation evolved Node B, also referred to as an ng-eNB, 114. Ng-eNB 114 may be connected to one or more gNBs 110 in NG-RAN 135—e.g. directly or indirectly via other gNBs 110 and/or other ng-eNBs. An ng-eNB 114 may provide LTE wireless access and/or evolved LTE (eLTE) wireless access to UE 105. Some gNBs 110 (e.g. gNB 110-2) and/or ng-eNB 114 in FIG. 1 may be configured to function as positioning-only beacons which may transmit signals (e.g. PRS signals) and/or may broadcast assistance data to assist positioning of UE 105 but may not receive signals from UE 105 or from other UEs. It is noted that while only one ng-eNB 114 is shown in FIG. 1, some embodiments may include multiple ng-eNBs 114.

Communication system 100 may also include one or more WLANs 116 which may connect to a Non-3GPP InterWorking Function (N3IWF) 150 in the 5GCN 140 (e.g. in the case of an untrusted WLAN 116). For example, the WLAN 116 may support IEEE 802.11 WiFi access for UE 105 and may comprise one or more WiFi access points (APs). Here, the N3IWF 150 may connect to other elements in the 5GCN 140 such as AMF 115. In some embodiments, WLAN 116 may support another RAT such as Bluetooth. The N3IWF 150 may provide support for secure access by UE 105 to other elements in 5GCN 140 and/or may support interworking of one or more protocols used by WLAN 116 and UE 105 to one or more protocols used by other elements of 5GCN 140 such as AMF 115. For example, N3IWF 150 may support IPsec tunnel establishment with UE 105, termination of IKEv2/IPsec protocols with UE 105, termination of N2 and N3 interfaces to 5GCN 140 for control plane and user plane, respectively, relaying of uplink and downlink control plane Non-Access Stratum (NAS) signaling between UE 105 and AMF 115 across an N1 interface. In some other embodiments, WLAN 116 may connect directly to elements in 5GCN 140 (e.g. AMF 115 as shown by the dashed line in FIG. 1) and not via N3IWF 150—e.g. if WLAN 116 is a trusted WLAN for 5GCN 140. It is noted that while only one WLAN 116 is shown in FIG. 1, some embodiments may include multiple WLANs 116.

As referred to herein, access nodes may comprise any of a variety of network entities enabling communication between the UE 105 and the AMF 115. This can include gNBs 110, ng-eNB 114, WLAN 116 and/or other types of cellular base stations. However, access nodes providing the functionality described herein may additionally or alternatively include entities enabling communications to any of a variety of RATs not illustrated in FIG. 1, which may include non-cellular technologies. Thus, the term "access node," as used in the embodiments described herein below, may include but is not necessarily limited to a gNB 110, ng-eNB 114 or WLAN 116.

As will be discussed in greater detail below, in some embodiments, an access node, such as a gNB 110, ng-eNB 114 or WLAN 116 (alone or in combination with other modules/units of the communication system 100), may be configured to, in response to receiving a request for location information for multiple RATs from the LMF 120, take measurements for one of the multiple RATs (e.g., measurements of the UE 105) and/or obtain measurements from the UE 105 that are transferred to the access node using one or more of the multiple RATs. As noted, while FIG. 1 depicts access nodes 110, 114 and 116 configured to communicate according to 5G NR, LTE and WiFi communication protocols, respectively, access nodes configured to communicate according to other communication protocols may be used, such as, for example, a Node B using a WCDMA protocol for a UMTS Terrestrial Radio Access Network (UTRAN), an eNB using an LTE protocol for an Evolved UTRAN (E-UTRAN), or a BT beacon using a Bluetooth protocol for a WLAN. For example, in a 4G Evolved Packet System (EPS) providing LTE wireless access to UE 105, a RAN may comprise an E-UTRAN, which may comprise base stations comprising eNBs supporting LTE wireless access. A core network for EPS may comprise an Evolved Packet Core (EPC). An EPS may then comprise an E-UTRAN plus EPC, where the E-UTRAN corresponds to NG-RAN 135 and the EPC corresponds to 5GCN 140 in FIG. 1. The methods and techniques described herein for UE 105 positioning using common or generic positioning procedures may be applicable to such other networks.

The gNBs 110 and ng-eNB 114 can communicate with an AMF 115, which, for positioning functionality, communicates with an LMF 120. The AMF 115 may support mobility of the UE 105, including cell change and handover of UE 105 from an access node 110, 114 or 116 of a first RAT to an access node 110, 114 or 116 of a second RAT. The AMF 115 may also participate in supporting a signaling connection to the UE 105 and possibly data and voice bearers for the UE 105. The LMF 120 may support positioning of the UE 105 when UE 105 accesses the NG-RAN 135 or WLAN 116 and may support position procedures and methods, including UE assisted/UE based and/or network based procedures/methods, such as Assisted GNSS (A-GNSS), OTDOA, Real Time Kinematics (RTK), Precise Point Positioning (PPP), Differential GNSS (DGNSS), ECID, OTDOA, angle of arrival (AOA), angle of departure (AOD), WLAN positioning, and/or other positioning procedures and methods. The LMF 120 may also process location services requests for the UE 105, e.g., received from the AMF 115 or from the GMLC 125. The LMF 120 may be connected to AMF 115 and/or to GMLC 125. The LMF 120 may be referred to by other names such as a Location Manager (LM), Location Function (LF), commercial LMF (CLMF) or value added LMF (VLMF). In some embodiments, a node/ system that implements the LMF 120 may additionally or alternatively implement other types of location-support modules, such as an E-SMLC or SLP. It is noted that in some embodiments, at least part of the positioning functionality (including determination of a UE 105's location) may be performed at the UE 105 (e.g., using signal measurements obtained by UE 105 for signals transmitted by wireless nodes such as gNBs 110, ng-eNB 114 and/or WLAN 116, and/or using assistance data provided to the UE 105, e.g. by LMF 120).

The Gateway Mobile Location Center (GMLC) 125 may support a location request for the UE 105 received from an external client 130 and may forward such a location request to the AMF 115 for forwarding by the AMF 115 to the LMF 120 or may forward the location request directly to the LMF 120. A location response from the LMF 120 (e.g. containing a location estimate for the UE 105) may be similarly returned to the GMLC 125 either directly or via the AMF 115, and the GMLC 125 may then return the location response (e.g., containing the location estimate) to the external client 130. The GMLC 125 is shown connected to both the AMF 115 and LMF 120 in FIG. 1 though only one of these connections may be supported by 5GCN 140 in some implementations.

As further illustrated in FIG. 1, the LMF 120 may communicate with the gNBs 110 and/or with the ng-eNB 114 using the NRPPa protocol (which also may be referred to as NPPa). NRPPa may be the same as, similar to, or an extension of the LPPa protocol, with NRPPa messages being transferred between a gNB 110 and the LMF 120, and/or between an ng-eNB 114 and the LMF 120, via the AMF 115. As further illustrated in FIG. 1, LMF 120 and UE 105 may communicate using the LPP protocol. LMF 120 and UE 105 may also or instead communicate using an NPP protocol, which may be the same as, similar to, or an extension of LPP. Here, LPP and/or NPP messages may be transferred between the UE 105 and the LMF 120 via the AMF 115 and a serving gNB 110-1 or serving ng-eNB 114 for UE 105. For example, LPP and/or NPP messages may be transferred between the LMF 120 and the AMF 115 using messages for service based operations (e.g. based on the Hypertext Transfer Protocol (HTTP)) and may be transferred between the AMF 115 and the UE 105 using a 5G NAS protocol. The LPP and/or NPP protocol may be used to support positioning of UE 105 using UE assisted and/or UE based position methods such as A-GNSS, RTK, OTDOA and/or ECID. The NRPPa protocol may be used to support positioning of UE 105 using network based position methods such as ECID (e.g. when used with measurements obtained by a gNB 110 or ng-eNB 114) and/or may be used by LMF 120 to obtain location related information from gNBs 110 and/or ng-eNB 114, such as parameters defining PRS transmission from gNBs 110 and/or ng-eNB 114.

In the case of UE 105 access to WLAN 116, LMF 120 may use NRPPa and/or LPP/NPP to obtain a location of UE 105 in a similar manner to that just described for UE 105 access to a gNB 110 or ng-eNB 114. Thus, NRPPa messages may be transferred between a WLAN 116 and the LMF 120, via the AMF 115 and N3IWF 150 to support network based positioning of UE 105 and/or transfer of other location information from WLAN 116 to LMF 120. Alternatively, NRPPa messages may be transferred between N3IWF 150 and the LMF 120, via the AMF 115, to support network based positioning of UE 105 based on location related information and/or location measurements known to or accessible to N3IWF 150 and transferred from N3IWF 150 to LMF 120 using NRPPa. Similarly, LPP and/or NPP messages may be transferred between the UE 105 and the LMF 120 via the AMF 115, N3IWF 150 and serving WLAN 116 for UE 105 to support UE assisted or UE based positioning of UE 105 by LMF 120.

With a UE assisted position method, UE 105 may obtain location measurements and send the measurements to a location server (e.g. LMF 120) for computation of a location estimate for UE 105. For example, the location measurements may include one or more of a Received Signal Strength Indication (RSSI), Round Trip signal propagation Time (RTT), Reference Signal Time Difference (RSTD), Time of Arrival (TOA), Reference Signal Received Power (RSRP), Reference Signal Received Quality (RSRQ), Receive-Transmit time difference (Rx-Tx), Angle of Arrival (AOA), Angle of Departure (AOD) or Timing Advance (TA) for gNBs 110, ng-eNB 114 and/or one or more access points for WLAN 116. The location measurements may also or instead include measurements of GNSS pseudorange, GNSS code phase and/or GNSS carrier phase for SVs 190. With a UE based position method, UE 105 may obtain location measurements (e.g. which may be the same as or similar to location measurements for a UE assisted position method) and may further compute a location of UE 105 (e.g. with the help of assistance data received from a location server such as LMF 120 or broadcast by gNBs 110, ng-eNB 114 or WLAN 116). With a network based position method, one or more base stations (e.g. gNBs 110 and/or ng-eNB 114), one or more APs (e.g. in WLAN 116) or N3IWF 150 may obtain location measurements (e.g. measurements of RSSI, RTT, RSRP, RSRQ, AOA or TOA) for signals transmitted by UE 105, and/or may receive measurements obtained by UE 105 or by an AP in WLAN 116 in the case of N3IWF 150, and may send the measurements to a location server (e.g. LMF 120) for computation of a location estimate for UE 105.

Information provided by the gNBs 110 and/or ng-eNB 114 to the LMF 120 using NRPPa may include timing and configuration information for PRS transmission and location coordinates. The LMF 120 can then provide some or all of this information to the UE 105 as assistance data in an LPP and/or NPP message via the NG-RAN 135 and the 5GCN 140.

An LPP or NPP message sent from the LMF 120 to the UE 105 may instruct the UE 105 to do any of a variety of things, depending on desired functionality. For example, the LPP or NPP message could contain an instruction for the UE 105 to obtain measurements for GNSS (or A-GNSS), WLAN, OTDOA and/or ECID (or some other position method). In the case of OTDOA, the LPP or NPP message may instruct the UE 105 to obtain one or more measurements (e.g. RSTD measurements) of PRS signals transmitted within particular cells supported by particular gNBs 110 and/or ng-eNB 114 (or supported by some other type of base station such as an eNB or WiFi AP). An RSTD measurement may comprise the difference in the times of arrival at the UE 105 of a signal (e.g. a PRS signal) transmitted or broadcast by one gNB 110 and a similar signal transmitted by another gNB 110. The UE 105 may send the measurements back to the LMF 120 in an LPP or NPP message (e.g. inside a 5G NAS message) via the serving gNB 110-1 (or serving ng-eNB 114) and the AMF 115.

As noted, while the communication system 100 is described in relation to 5G technology, the communication system 100 may be implemented to support other communication technologies, such as GSM, WCDMA, LTE, etc., that are used for supporting and interacting with mobile devices such as the UE 105 (e.g., to implement voice, data, positioning, and other functionalities). In some such embodiments, the 5GCN 140 may be configured to control different air interfaces. For example, in some embodiments, both the NG-RAN 135 and the 5GCN 140 may be replaced by other RANs and other core networks. For example, in an EPS, the NG-RAN 135 may be replaced by an E-UTRAN containing eNBs and the 5GCN 140 may be replaced by an EPC containing a Mobility Management Entity (MME) in place of the AMF 115, an E-SMLC in place of the LMF 120 and a GMLC that may be similar to the GMLC 125. In such an EPS, the E-SMLC may use LPPa in place of NRPPa to send and receive location information to and from the eNBs in the E-UTRAN and may use LPP to support positioning of UE 105. In these other embodiments, generic positioning procedures and methods for a UE 105 could be supported in an analogous manner to that described herein for a 5G network with the difference that functions and procedures described herein for gNBs 110, ng-eNB 114, AMF 115 and LMF 120 could, in some cases, apply instead to other network elements such eNBs, WiFi APs, an MME and an E-SMLC.

To support certain position methods such as OTDOA and transmission or PRS or other signals used in positioning of a UE 105, base stations may be synchronized. In a synchronized network, the transmission timing of gNBs 110 may be synchronized such that each gNB 110 has the same transmission timing as every other gNB 110 to a high level of precision—e.g. 50 nanoseconds or less. Alternatively, the gNBs 110 may be synchronized at a radio frame or subframe level such that each gNB 110 transmits a radio frame or subframe during the same time duration as every other gNB 110 (e.g. such that each gNB 110 starts and finishes transmitting a radio frame or subframe at almost precisely the same times as every other gNB 110), but does not necessarily maintain the same counters or numbering for radio frames or subframes. For example, when one gNB 110 is transmitting a subframe or radio frame with counter or number zero (which may be the first radio frame or subframe in some periodically repeated sequence of radio frames or subframes), another gNB 110 may be transmitting a radio frame or subframe with a different number or counter such as one, ten, one hundred etc.

Synchronization of the transmission timing of ng-eNBs 114 in NG-RAN 135 may be supported in a similar manner to synchronization of gNBs 110, although since ng-eNBs 114 may typically use a different frequency to gNBs 110 (to avoid interference), an ng-eNB 114 may not always be synchronized to gNBs 110. Synchronization of gNBs 110 and ng-eNBs 114 may be achieved using a GPS receiver or a GNSS receiver in each gNB 110 and ng-eNB 114 or by other means such as using the IEEE 1588 Precision Time Protocol.

Figure 2:
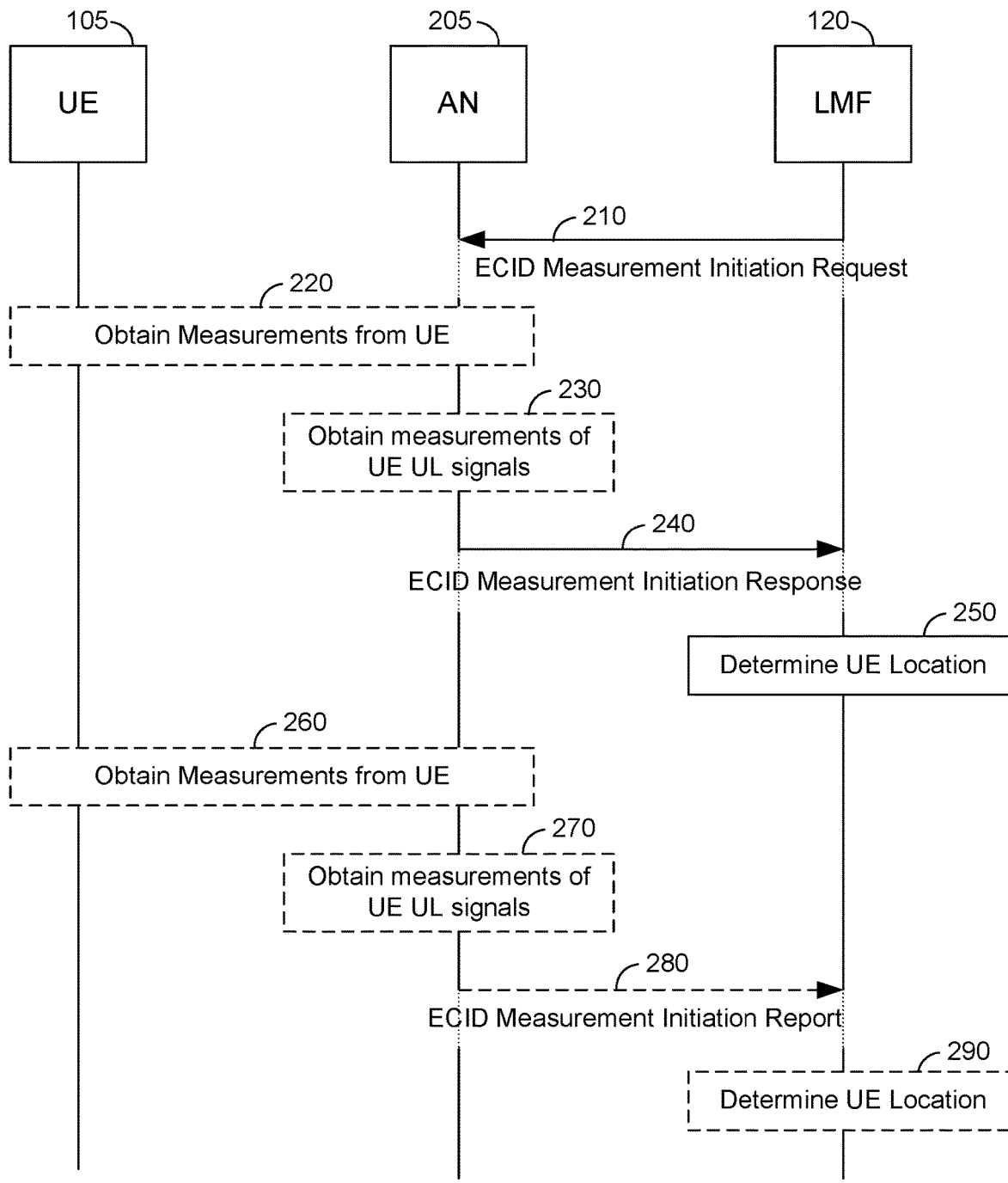
FIG. 2 is a signal flow diagram illustrating an embodiment of a generic procedure for enhanced cell ID (ECID) positioning, according to the description.

In the case of network based ECID positioning, embodiments may utilize a generic procedure supported by NRPPa for UE access using NR (via a gNB 110), LTE (via an ng-eNB 114) or WiFi (via a trusted or untrusted WLAN 116). The generic procedure is shown in FIG. 2, in the case of communication system 100, which shows a signaling flow for network based ECID positioning, and includes a target UE 105, a serving access node (AN) 205 for the UE and an LMF 120. The AN 205 may be a gNB for NR access (e.g., gNB 110-1 of FIG. 1), an ng-eNB for LTE access (e.g. ng-eNB 114) or a trusted WLAN for WiFi access (e.g. WLAN 116). In some embodiments, the AN 205 may comprise an N3IWF (e.g. N3IWF 150 in FIG. 1), where the N3IWF connects to an untrusted WLAN (e.g. a WLAN 116 and not shown in FIG. 2). The LMF 120 may not know unambiguously which particular node the serving AN 205 is or the RAT supported by AN 205.

For FIG. 2, it is assumed that LMF 120 needs to obtain a location of UE 105, e.g. due to receiving a location request for UE 105 from another entity. For example, LMF 120 may receive a location request for UE 105 from AMF 115, where AMF 115 received the location request from UE 105 or from GMLC 125, and where GMLC 125 may have received the location request from external client 130. Alternatively, LMF 120 may receive a location request for UE 105 directly from GMLC 125, where GMLC 125 may have received the location request from external client 130. LMF 120 may then perform the procedure shown in FIG. 2 in order to obtain or to help obtain the requested location for UE 105.

At stage 210 in FIG. 2, the LMF 120 sends an NRPPa ECID Measurement Initiation Request to the serving AN 205, via the serving AMF 115 for the UE 105 (not shown in FIG. 2), to request ECID measurements from the AN 205 for the UE 105. The LMF 120 may request measurements applicable to multiple RATs, such as NR access, LTE access and/or WiFi access, for example. Table 1, herein below, shows which measurements may be requested. The measurements may be requested one time only (referred to as "on demand") or following certain triggered or periodic events (referred to as "periodic or triggered").

At stage 220, optionally (e.g., if requested at stage 1 for on demand location), the serving AN 205 requests and obtains measurements from the UE 105, where UE 105 obtains the measurements for downlink (DL) signals received from the serving AN 205 and/or from neighboring ANs. Table 2, herein below, shows which measurements may be requested and obtained. The neighboring ANs may be for the same RAT as the serving AN 205 and/or for other RATs. Stage 220 may be supported using a Radio Resource Control (RRC) protocol for NR or LTE access by the UE 105 (e.g. when AN 205 is a gNB 110 or ng-eNB 114, respectively) or using an IEEE 802.11 protocol for WiFi access when AN 205 is a trusted WLAN 116. In the case of UE 105 access to an untrusted WLAN 116 where AN 205 is an N3IWF (e.g. NWIWF 150), AN 205 may request and obtain measurements from the UE 105 at stage 220 by sending a request to the untrusted WLAN 116 which may then send a request to UE 105 (e.g. using an IEEE 802.11 protocol), receive measurements returned by UE 105 and forward the measurements to AN 205.

At stage 230, optionally (e.g., if requested at stage 1 for on demand location), the serving AN 205 obtains measurements for uplink (UL) signals received from the UE 105. The description further down for Table 2 shows which measurements may be obtained. When AN 205 is a gNB 110, ng-eNB 114 or trusted WLAN 116, AN 205 may obtain the measurements directly of UL signals received from UE 105. When AN 205 is an N3IWF (e.g. N3IWF 150), AN 205 may request and obtain measurements from an untrusted WLAN 116 at stage 230, where the untrusted WLAN 116 obtains measurements of UL signals received from UE 105 and returns the measurements to AN 205.

At stage 240, the serving AN 205 returns any measurements obtained at stage 220 and/or stage 230 to the LMF 120 in an NRPPa ECID Measurement Initiation Response. The description further down for Table 2 shows which measurements may be returned. For periodic or triggered location, the serving AN 205 may return an NRPPa ECID Measurement Initiation Response containing no measurements at stage 240.

At stage 250, the LMF 120 may determine a location for the UE 105 using any measurements received at stage 240

(and possibly using other measurements obtained by LMF 120 using other procedures not shown in FIG. 2).

At stages 260-290, for instances in which a periodic or triggered location request is sent at stage 210, the serving AN 205 may repeat the functionality of stages 220-240 one or more times at stages 260-280 and the LMF 120 may determine a new UE location for each repetition at stage 290. In this case, AN 205 would normally obtain measurements for at least one of stages 260 and 270 and may return the measurements to LMF 120 by sending an NRPPa ECID Measurement Initiation Report containing the measurements.

Table 1 shows which measurements may be requested by the LMF 120 at stage 210. Measurements may be requested by including one or more of the Information Elements (IEs) shown in Table 1 in the NRPPa ECID Measurement Initiation Request sent at stage 210. The LMF 120 may include any combination of the IEs shown in Table 1 and, for each included IE, may indicate a request for any of the measurements shown in the second column. For example, if LMF 120 needs measurements obtained by UE 105 as at stage 220 or 260 in FIG. 2 for an NR RAT, LMF 120 may include the "UE NR measurements" IE shown in Table 1 in the ECID Measurement Initiation Request and may indicate in this IE measurements of one or more of RTT, RSRP, RSRQ, AOA, AOD, Rx-Tx, RSTD or TOA. Although the LMF 120 may not know the serving RAT for the target UE (e.g. whether the serving RAT is NR, LTE or WiFi), the LMF 120 can request measurements applicable to some or all RATs and the serving AN 205 may then obtain and return only those measurements supported by AN 205, as described below for Table 2.

The measurements shown in rows 2-4 of Table 1 may be obtained by the AN 205 at stage 230 and/or at stage 270 by measuring (or obtaining measurements from another entity of) UL signals transmitted by the UE 105. The measurement shown in rows 5-7 of Table 1 may be obtained by the UE 105 at stage 220 and/or at stage 260 by measuring DL signals transmitted by a serving AN 205 and/or by other ANs for the same RAT and/or for other RATs.

TABLE 1

| Information Element (IE) | Possible Measurements Requested by LMF 120 |
|---|---|
| gNB measurements | RTT, TA, RSSI, AOA, Rx-Tx |
| ng-eNB measurements | RTT, TA, RSSI, AOA, Rx-Tx |
| WLAN measurements | RTT, RSSI |
| UE NR measurements | RTT, RSRP, RSRQ, AOA, AOD, Rx-Tx, RSTD, TOA |
| UE LTE measurements | RTT, RSRP, RSRQ, Rx-Tx, RSTD, TOA |
| UE WLAN measurements | RTT, RSSI |

Table 2 shows which measurements may be obtained by the AN 205 at stages 220 and 230 (and stages 260 and 270, when applicable) and returned to the LMF 120 at stage 240 (and stage 280). The measurements are conditional on the type of RAT supported by the serving AN 205 with the three columns on the right of Table 2 showing which IEs and measurements can be obtained and returned for each RAT (via a "Yes" entry for measurements which can be returned and a "No" entry for measurements which cannot be returned). For the exemplary ECID procedure described here, each of the types of measurements obtained by the UE 105 (shown in the last three rows of Table 2) may be obtained and returned by the AN 205 regardless of the RAT supported by AN 205. In contrast, and as shown in rows 2-4 of Table 2, the serving AN 205 may only obtain and return measurements corresponding to the RAT supported by the serving AN 205. As an example, if LMF 120 includes a request for any of the measurements associated with any of the IEs for rows 5-7 in Table 2, serving AN 205 may request all of these measurements from UE 105 at stage 220 (or stage 260) which may then all be obtained and returned by UE 105 if supported by UE 105. In contrast, if LMF 120 includes a request for any of the measurements associated with the IEs for rows 2-4 in Table 2, serving AN 205 may only obtain and return the measurements if the serving AN 205 supports the corresponding RAT. For example, if LMF 120 includes an IE requesting gNB measurements (for row 2) comprising one or more of RTT, TA, RSSI, AOA or Rx-Tx, serving AN 205 may only obtain and return the measurements if serving AN 205 supports the NR RAT (and thus only if serving AN 205 comprises a gNB 110).

TABLE 2

| IE | Possible Measurements Returned by AN 205 | Applicable RAT | | |
|---|---|---|---|---|
| | | NR | LTE | WiFi |
| gNB measurements | RTT, TA, RSSI, AOA, Rx-Tx | Yes | No | No |
| ng-eNB measurements | RTT, TA, RSSI, AOA, Rx-Tx | No | Yes | No |
| WLAN measurements | RTT, RSSI | No | No | Yes |
| UE NR measurements | RTT, RSRP, RSRQ, AOA, AOD, Rx-Tx, RSTD, TOA | Yes | Yes | Yes |
| UE LTE measurements | RTT, RSRP, RSRQ, Rx-Tx, RSTD, TOA | Yes | Yes | Yes |
| UE WLAN measurements | RTT, RSSI | Yes | Yes | Yes |

The generic procedure, messages and parameters described above and illustrated in FIG. 2 and Tables 1-2 enable an LMF 120 to request and obtain ECID measurements for any serving RAT for the target UE 105. In addition, for a periodic or triggered request at stage 210 where the UE 105 changes serving AN and serving RAT after stage 240, the new serving AN may continue to support the procedure by performing stages 260-280 if the original serving AN 205 transfers the information from the request received at stage 210 to the new AN (not shown in FIG. 2).

Figure 3:
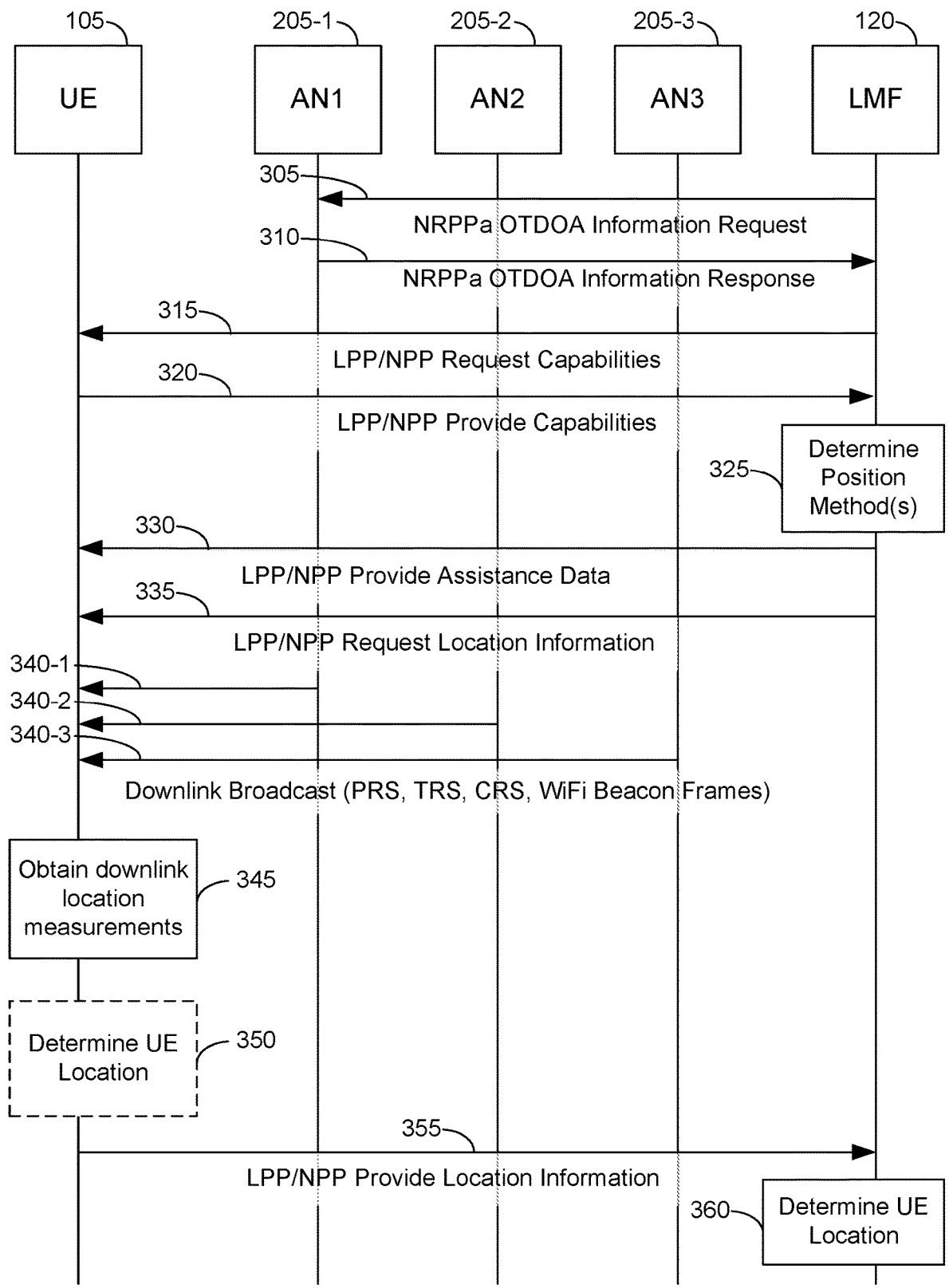
FIG. 3 is a signal flow diagram illustrating an embodiment of a generic procedure for OTDOA positioning, according to the description.

In the case of UE assisted or UE based OTDOA positioning, a generic procedure may be supported by LPP and/or by NPP for UE access using NR (e.g. via a gNB 110), LTE (e.g. via an ng-eNB 114) or WiFi (e.g. via a trusted or untrusted WLAN 116). An embodiment of such a generic procedure is shown in FIG. 3, in the case of communication system 100, which shows a signaling flow for UE assisted or UE based OTDOA positioning and includes a target UE 105, three access nodes (AN1 205-1, AN2 205-2, and AN3 205-3, collectively and generically referred to herein as access nodes, or ANs, 205) and an LMF 120. The ANs 205 can include gNBs for NR access (e.g., gNBs 110 of FIG. 1), ng-eNBs for LTE access (e.g., ng-eNB 114), eNBs in E-UTRAN for LTE access or WLANs for WiFi access (e.g. WLAN 116). It is assumed that AN1 205-1 is the serving AN. However, the LMF 120 may not know the identity of AN1 205-1 or the RAT supported by AN1 205-1. The messages used in FIG. 3 are referred to below as LPP/NPP messages and may each compromise an LPP message, an NPP message or an LPP message combined with an NPP message (e.g. where an LPP message contains an embedded NPP message).

As for FIG. 2, it is assumed for FIG. 3 that LMF 120 needs to obtain a location of UE 105, e.g. due to receiving a location request for UE 105 from another entity as described previously for FIG. 2 and that LMF 120 performs the procedure shown in FIG. 3 in order to obtain or to help obtain the requested location for UE 105.

At stage 305 in FIG. 3, at any time prior to stage 330, the LMF 120 may send an NRPPa OTDOA Information Request to AN1 205-1 to obtain information from AN1 205-1 related to one or more signals (e.g. PRS, TRS or CRS) broadcast from AN1 205-1 if AN1 205-1 is a gNB 110 or ng-eNB 114. LMF 120 may select AN1 205-1 based on known proximity to the target UE 105, for example, if the LMF 120 is informed about the initial serving cell for the UE 105 (e.g. from the serving AMF). The one or more broadcast signals may be reference signals used for OTDOA RSTD measurements.

At stage 310, AN1 205-1 returns information to the LMF 120 in an NRPPa OTDOA Information Response concerning one or more signals (e.g. PRS, TRS or CRS) broadcast from AN1 205-1 and as requested at stage 305. For example, AN1 205-1 may provide information concerning PRS, TRS or CRS configurations supported by AN1 205-1. The configuration information for each broadcast signal could include, for example, a signal identity (ID) (e.g. a PRS ID), signal bandwidth, carrier frequency, coding, a frequency shift, periodicity (e.g. a starting subframe and number of subframes between consecutive occurrences of the broadcast signal), duration (e.g. number of consecutive subframes used to broadcast the signal), and/or a muting pattern. The AN1 205-1 may also provide information related to AN1 205-1 and/or to cells supported by AN1 205-1 such as location coordinates of a cell antenna (or cell antennas), type(s) of antenna used by AN1 205 and/or cell timing information (e.g. such as cell timing relative to an absolute time like GPS time or Coordinated Universal Time (UTC)). The LMF 120 may perform stages similar to stages 305 and 310 to obtain OTDOA information from AN2 205-2, AN3 205-3 and possibly other ANs (not shown in FIG. 3).

At stage 315, the LMF 120 may send an LPP/NPP Request Capabilities message to the UE 105 to request the positioning capabilities of the UE 105 as applicable to LPP/NPP.

At stage 320, the UE 105 returns its positioning capabilities to the LMF 120 in an LPP/NPP Provide Capabilities message. For example, the capabilities may indicate the position methods supported by the UE 105, the measurements for each supported position method that are supported by the UE 105, the types of assistance data supported by the UE 105 for each supported position method and the RATs supported by the UE 105.

At stage 325, based on the positioning capabilities of the UE 105 obtained at stage 320 and other information such as the RATs supported by the Public Land Mobile Network (PLMN) operator of LMF 120 in the vicinity of the UE 105, the LMF 120 determines one or more position methods to be used to locate the UE 105. In this example, the position methods include generic UE assisted or UE based OTDOA. The LMF 120 then selects a reference cell (or cells) and neighboring cells for OTDOA. The reference cell(s) may correspond to a current or previous serving cell for the UE 105 and the neighboring cells may be other cells nearby to the UE 105 (e.g. nearby to a current or previous serving cell for UE 105). The reference and neighboring cells may all be for the same RAT or may be for different RATs—e.g. LTE and NR. The reference cell may be supported by one access node (e.g. AN1 205-1) and the neighboring cells may be supported by other access nodes (e.g. AN2 205-2 and AN3 205-3).

At stage 330, the LMF 120 sends assistance data to the UE 105 in an LPP/NPP Provide Assistance Data message. In this example the assistance data includes information for one or more signals broadcast by each of the reference and neighboring cells selected at stage 325 and possibly other information for the reference and neighboring cells such as cell timing, differences in cell timing (e.g. between a reference cell and a neighbor cell) and/or location coordinates of cell antennas. For example, the information may comprise PRS, TRS and/or CRS configuration information and possibly other AN or cell related information as obtained by the LMF 120 from AN1 205-1 at stage 310 and at stages similar to stage 310 from other ANs. Alternatively, some or all of this information may already be configured in LMF 120.

At stage 335, the LMF 120 sends a request for location measurements or a location estimate to the UE 105 in an LPP/NPP Request Location Information message. When generic UE assisted OTDOA is selected at stage 325, a request for OTDOA RSTD measurements is included. When generic UE based OTDOA is selected at stage 325, a request for a location estimate is included.

At stage 340, AN1 205-1, AN2 205-2 and AN3 205-3 broadcast signals throughout their coverage areas which may be received by the UE 105. For an AN 205 which is a gNB 110, ng-eNB 114 or an eNB, the signals may include a PRS, TRS, CRS or some other reference signal. For an AN 205 which is a WiFi AP, the signals may include an IEEE 802.11 beacon frame or some other IEEE 802.11 frame or frames.

At stage 345, the UE 105 acquires and measures one or more of the signals broadcast at stage 340 and obtains one or more of the measurements requested at stage 335 in the case of UE assisted OTDOA. The measurements may include measurements of RSTD for OTDOA between a signal (e.g. PRS, TRS, or CRS) from a reference cell and a signal from a neighboring cell. The reference cell may be the same as a reference cell selected by the LMF 120 at stage 325 or may be a different reference cell selected by the UE 105 (e.g. such as a current serving cell for the UE 105). For each RSTD measurement, the RAT for the reference cell and the RAT for the neighboring cell may be the same RAT or the two RATs may be different. For example, when the reference cell is for NR, UE 105 may obtain an RSTD for a neighboring cell that is also for NR or is for LTE. Similarly, when the reference cell is for LTE, UE 105 may obtain an RSTD for a neighboring cell that is also for LTE or is for NR.

At stage 350, if generic UE based OTDOA was selected by the LMF 120 at stage 325, the UE 105 computes a location of UE 105 based on the measurements obtained at stage 345 and the assistance data received at stage 330. For example, if the assistance data includes the antenna locations for AN1 205-1, AN2 205-2, AN3 205-3 and other ANs and timing differences between the reference cell(s) and neighboring cells selected at stage 325, the UE 105 may obtain a location using multilateration based on known OTDOA techniques.

At stage 355, the UE 105 returns the location estimate obtained at stage 350 or the measurements obtained at stage 345 to the LMF 120 in an LPP/NPP Provide Location Information message.

At stage 360, if generic UE assisted OTDOA was selected by the LMF 120 at stage 325, the LMF 120 computes a location for the UE 105 based on the measurements received at stage 355 and information configured in LMF 120 and/or received at stage 310 and at similar stages for AN1 205-1, AN2 205-2, AN3 205-3 and other ANs. The LMF 120 may obtain a location using multilateration based on known OTDOA techniques.

To support the generic OTDOA procedure shown in FIG. 3, the LMF 120 may provide assistance data to the UE 105 at stage 330 for cells belonging to two or more different RATs. For example, the cells may comprise cells for LTE access from an eNB, cells for LTE access from an ng-eNB (e.g. ng-eNB 114), and/or cells for NR access from a gNB (e.g. gNB 110-1). A single reference cell may be provided by LMF 120 to UE 105 at stage 330 for which the UE 105 obtains an RSTD measurement for each neighbor cell regardless of whether the neighbor cell is for the same RAT as the reference cell or is for a different RAT. In other embodiments, a different reference cell may be provided by LMF 120 to UE 105 at stage 330 for each RAT. For example, in these other embodiments, LMF 120 may provide a first reference cell for NR, a second reference cell for LTE access from an ng-eNB, and a third reference cell for LTE access from an eNB, though in some embodiments only one of the second and the third reference cells may be provided. The UE 105 may then obtain an RSTD for each reference cell only for neighbor cells that belong to the same RAT as the reference cell (e.g. with LTE access to an ng-eNB considered to be the same RAT as LTE access to an eNB when only one of the second and third reference cells is provided).

As an example of these different reference cells, assume that cells C1, C2, ... CN belong to a first RAT and cells c1, c2, ... cM belong to a second RAT. If one reference cell is used for all RATs, the LMF 120 may select cell C1 as the single reference cell and a UE 105 may obtain a separate RSTD measurement for each of the cells C2, C2 ... CN, c1, c2, ... cM, where each separate RSTD measurement is an RSTD for one of these cells and the reference cell C1. Conversely, when one reference cell is used for each RAT, the LMF 120 may select cell C1 as the reference cell for the first RAT and cell c1 as the reference cell for the second RAT, and a UE 105 may obtain a separate RSTD measurement for each of cells C2, C2 ... CN with respect to the reference cell C1 and a separate RSTD measurement for each of cells c2, c3, ... cM with respect to the reference cell c1.

Because the OTDOA reference and neighbor cells provided at stage 330 can include cells for different RATs, the UE 105 may obtain RSTD measurements at stage 345 regardless of which RAT the UE 105 is currently accessing. In addition, the UE 105 may continue to obtain RSTD measurements at stage 345 after a cell change or handover to a different RAT. Further, if the UE 105 is accessing a RAT for which OTDOA is not directly applicable such as WiFi for WLAN 116, the UE 105 may still obtain the RSTD measurements at stage 345 by periodically tuning to an NR and/or LTE frequency and measuring the timing of the reference cell(s) and neighbor cells provided by LMF 120 at stage 330.

As a person of ordinary skill in the art will appreciate, UE assisted ECID positioning methods can also be modified in accordance to the techniques described herein, in a manner similar to the embodiments described in FIG. 3. In particular, a location server may send a request to the UE for location measurements from the UE for a plurality of radio access types. The UE can then obtain location measurements of signals transmitted by at least one access node of the plurality of radio access types, returning the location measurements to the location server. The location server can then use those location measurements to determine a location of the UE. An example of a UE-assisted ECID positioning method is illustrated in FIG. 4.

Figure 4:
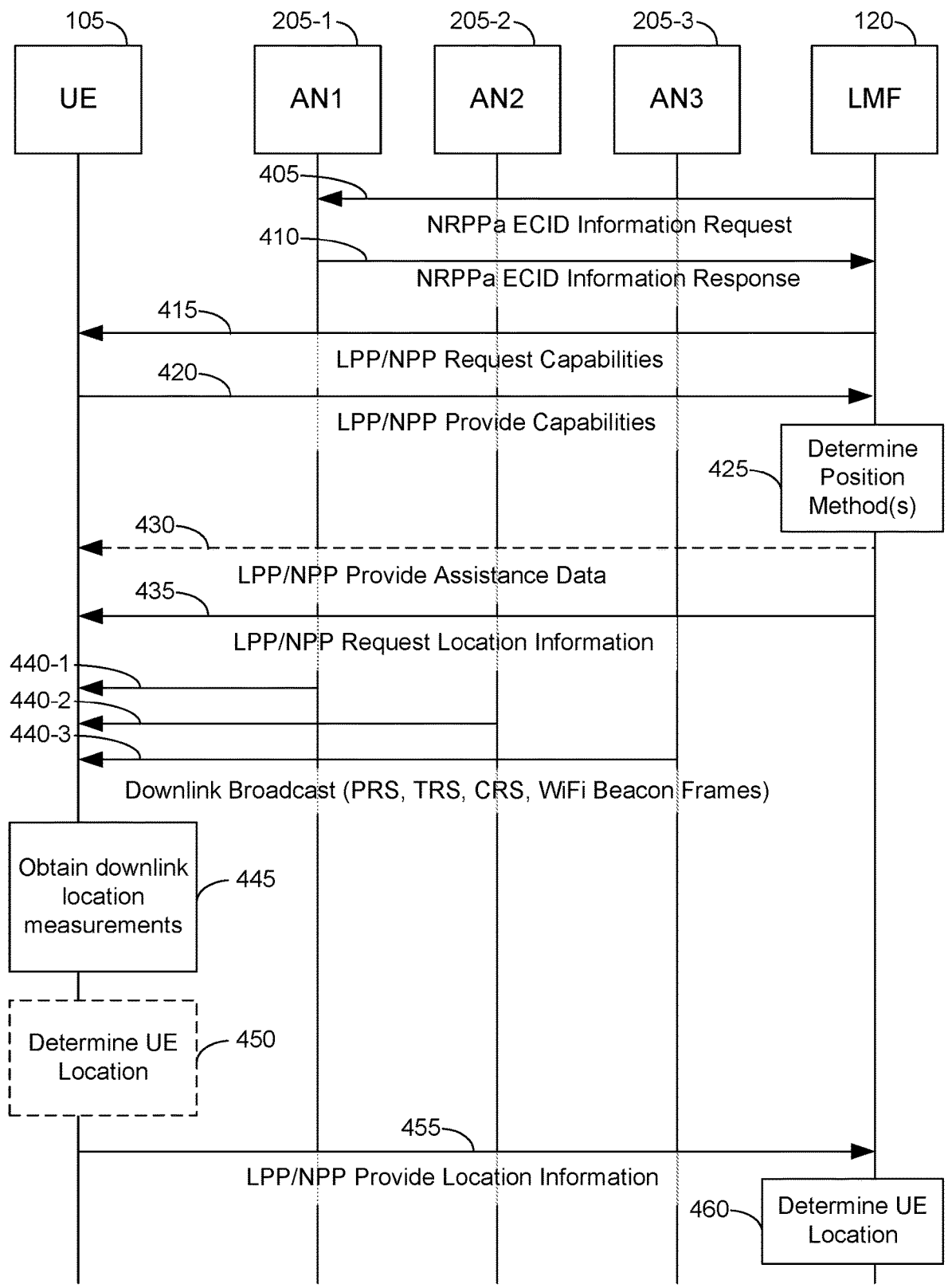
FIG. 4 is a signal flow diagram illustrating another embodiment of a generic procedure for ECID positioning, according to the description.

FIG. 4 shows a signaling flow illustrating an embodiment of a UE assisted ECID positioning method, in the case of communication system 100. Similar to FIG. 3, the embodiment illustrated in FIG. 4 includes a target UE 105, ANs, 205, and an LMF 120. The ANs 205 can include gNBs (e.g. gNBs 110), ng-eNBs (e.g. ng-eNB 114), eNBs in E-UTRAN for LTE access, or WLANs for WiFi access (e.g. WLAN 116). Again, it is assumed that AN1 205-1 is the serving AN, and the LMF 120 may not know the identity of AN1 205-1 or the RAT supported by AN1 205-1. Stages 405-460 in FIG. 4 generally correspond with counterpart stages 305-360 in FIG. 3 as described above, but for ECID positioning.

As for FIGS. 2 and 3, it is assumed for FIG. 4 that LMF 120 needs to obtain a location of UE 105, e.g. due to receiving a location request for UE 105 from another entity as described previously for FIG. 2 and that LMF 120 performs the procedure shown in FIG. 4 in order to obtain or to help obtain the requested location for UE 105.

At stage 405, for example, LMF 120 may send an NRPPa ECID Information Request to AN1 205-1 to obtain information from AN1 205-1 related to one or more signals (e.g. PRS, TRS or CRS) broadcast from AN1 205-1 if AN1 205-1 is a gNB 110 or ng-eNB 114. LMF 120 may select AN1 205-1 based on known proximity to the target UE 105, for example, if the LMF 120 is informed about the initial serving cell for the UE 105 (e.g. from the serving AMF). The one or more broadcast signals may be reference signals used for ECID measurements.

At stage 410, AN1 205-1 returns information to the LMF 120 in an NRPPa ECID Information Response concerning one or more signals (e.g. PRS, TRS or CRS) broadcast from AN1 205-1 and as requested at stage 405. For example, AN1 205-1 may provide information concerning PRS, TRS or CRS configurations supported by AN1 205-1. The configuration information for each broadcast signal could include, for example, a signal identity (ID) (e.g. a PRS ID), signal bandwidth, carrier frequency, coding, a frequency shift, periodicity (e.g. a starting subframe and number of subframes between consecutive occurrences of the broadcast signal), duration (e.g. number of consecutive subframes used to broadcast the signal), and/or a muting pattern. The AN1 205-1 may also provide information related to AN1 205-1 or to cells supported by AN1 205-1 such as location coordinates of a cell antenna (or cell antennas), type(s) of antenna used by AN1 205 and/or cell timing information (e.g. such as cell timing relative to an absolute time like GPS time or Coordinated Universal Time (UTC)). The LMF 120 may perform stages similar to stages 405 and 410 to obtain ECID information from AN2 205-2, AN3 205-3 and possibly other ANs (not shown in FIG. 4).

In one embodiment, the NRPPa ECID Information Request sent at stage 405 and the NRPPa ECID Information Response returned at stage 410 may be replaced by an NRPPa OTDOA Information Request and an NRPPa OTDOA Information Response, respectively (e.g. as used for stages 305 and 310 in FIG. 3). This embodiment may take advantage of information used by a UE 105 for ECID positioning being similar to (e.g. a subset of) information used by a UE 105 for OTDOA positioning and may avoid the need to define and implement additional NRPPa messages to support ECID positioning by a UE 105. In another embodiment, stages 405 and 410 may not occur—e.g. if stage 430 is omitted and no assistance data for ECID is sent by LMF 120 to UE 105.

At stage 415, the LMF 120 may send an LPP/NPP Request Capabilities message to the UE 105 to request the positioning capabilities of the UE 105 as applicable to LPP/NPP.

At stage 420, the UE 105 returns its positioning capabilities to the LMF 120 in an LPP/NPP Provide Capabilities message. For example, the capabilities may indicate the position methods supported by the UE 105, the measurements for each supported position method that are supported by the UE 105, the types of assistance data supported by the UE 105 for each supported position method and the RATs supported by the UE 105.

At stage 425, based on the positioning capabilities of the UE 105 obtained at stage 420 and other information such as the RATs supported by the PLMN operator of LMF 120 in the vicinity of the UE 105, the LMF 120 determines one or more position methods to be used to locate the UE 105. In this example, the position methods include generic UE assisted or UE based ECID.

Optionally, at stage 430, the LMF 120 may send assistance data to the UE 105 in an LPP/NPP Provide Assistance Data message. In this example the assistance data may include information for one or more signals broadcast by a current or previous serving cell for UE 105 and/or one or more neighbor cells in the vicinity of UE 105. For example, the information may comprise PRS, TRS and/or CRS configuration information and/or other AN or cell related information (e.g. such as cell antenna coordinates) as obtained by the LMF 120 from AN1 205-1 at stage 410 and at stages similar to stage 410 from other ANs. Alternatively, some or all of this information may already be configured in LMF 120. In some embodiments, stage 430 does not occur and instead UE 105 may obtain information concerning signals broadcast from a serving cell and neighboring cells and/or other information for a serving and neighboring cells (e.g. such as cell antenna coordinates) from the serving AN1 205-1 (e.g. from information broadcast by AN1 205-1 in System Information Blocks (SIBs) or from information sent point to point by AN1 205-1 to UE 105, using RRC for example).

At stage 435, the LMF 120 sends a request for location measurements or a request for a location estimate to the UE 105 in an LPP/NPP Request Location Information message. When generic UE assisted ECID is selected at stage 425, LMF 120 may request measurements for one or more of RSSI, RTT, RSTD, RSRP, RSRQ, Rx-Tx, AOA, AOD, and/or TA. These measurements may be requested separately for each of one or more different RATs. For example, the LMF 120 may request one combination of measurements (from among RSSI, RTT, RSTD, RSRP, RSRQ, Rx-Tx, AOA, AOD, and/or TA) for NR access, another combination of measurements for LTE access to an EPS and/or to a 5GCN (which may be the same as or different to the combination for NR access), a third combination of measurements for WiFi access (which may also be the same as or different to the combination(s) for NR and/or LTE access) and possibly a fourth combination of measurements for LTE access to whichever of 5GCN 140 or an EPS is not included for the second combination in the case that LTE access to EPS and LTE access to 5GCN 140 are treated as being different RATs. When generic UE based ECID is selected at stage 425, a request for a location estimate is included instead of a request for ECID measurements.

At stage 440, AN1 205-1, AN2 205-2 and AN3 205-3 broadcast signals throughout their coverage areas which may be received by the UE 105. For an AN 205 which is a gNB 110, ng-eNB 114 or an eNB, the signals may include a PRS, TRS, CRS or some other reference signal. For an AN 205 which is a WiFi AP, the signals may include an IEEE 802.11 beacon frame or some other IEEE 802.11 frame or frames.

At stage 445, the UE 105 acquires and measures one or more of the signals broadcast at stage 440 and obtains one or more of the measurements requested at stage 435 in the case of UE assisted ECID. Typically, UE 105 may obtain measurements requested for RAT(s) which comprise the current serving RAT(s) for UE 105, though in some implementations, UE 105 may also (or instead) obtain measurements for a RAT or RATs different than the serving RAT if UE 105 is able to receive and measure signals for these RATs.

At stage 450, if generic UE based ECID was selected by the LMF 120 at stage 425, the UE 105 computes a location of UE 105 based on the measurements obtained at stage 445 and the assistance data received at stage 430. For example, if the assistance data includes the antenna locations for AN1 205-1, AN2 205-2, AN3 205-3 and other ANs, the UE 105 may obtain a location using triangulation, multilateration, and/or other techniques, as applicable to the measurements obtained at stage 445.

At stage 455, the UE 105 returns the location estimate obtained at stage 450 or the measurements obtained at stage 445 to the LMF 120 in an LPP/NPP Provide Location Information message.

At stage 460, if generic UE assisted ECID was selected by the LMF 120 at stage 425, the LMF 120 computes a location for the UE 105 based on the measurements received at stage 455 and information configured in LMF 120 and/or received at stage 410 and at similar stages for AN1 205-1, AN2 205-2, AN3 205-3 and other ANs. The LMF 120 may obtain a location using triangulation, multilateration, and/or other techniques, as applicable to the measurements received at stage 455 (e.g. based on known ECID techniques).

To support the generic ECID procedure shown in FIG. 4, the LMF 120 may provide assistance data to the UE 105 at stage 430 for cells and/or APs supporting two or more different RATs. For example, the cells may comprise cells for LTE access from an eNB, cells for LTE access from an ng-eNB (e.g. ng-eNB 114), and/or cells for NR access from a gNB (e.g. gNB 110-1). In addition, assistance data may be provided at stage 430 for WiFi APs. The LMF 120 may also or instead request measurements from UE 105 at stage 435 for two or more different RATs in the case of generic UE assisted ECID. The LMF 120 may not initially know the current serving cell (or serving WiFi AP) for UE 105 or the current serving RAT(s) but, by providing assistance data for multiple RATs at stage 430 and/or by requesting measurements for multiple RATs at stage 435, may still be able to obtain measurements or a location estimate from UE 105 at stage 455, which may enable a location of UE 105 to be obtained by LMF 120.

Figure 5:
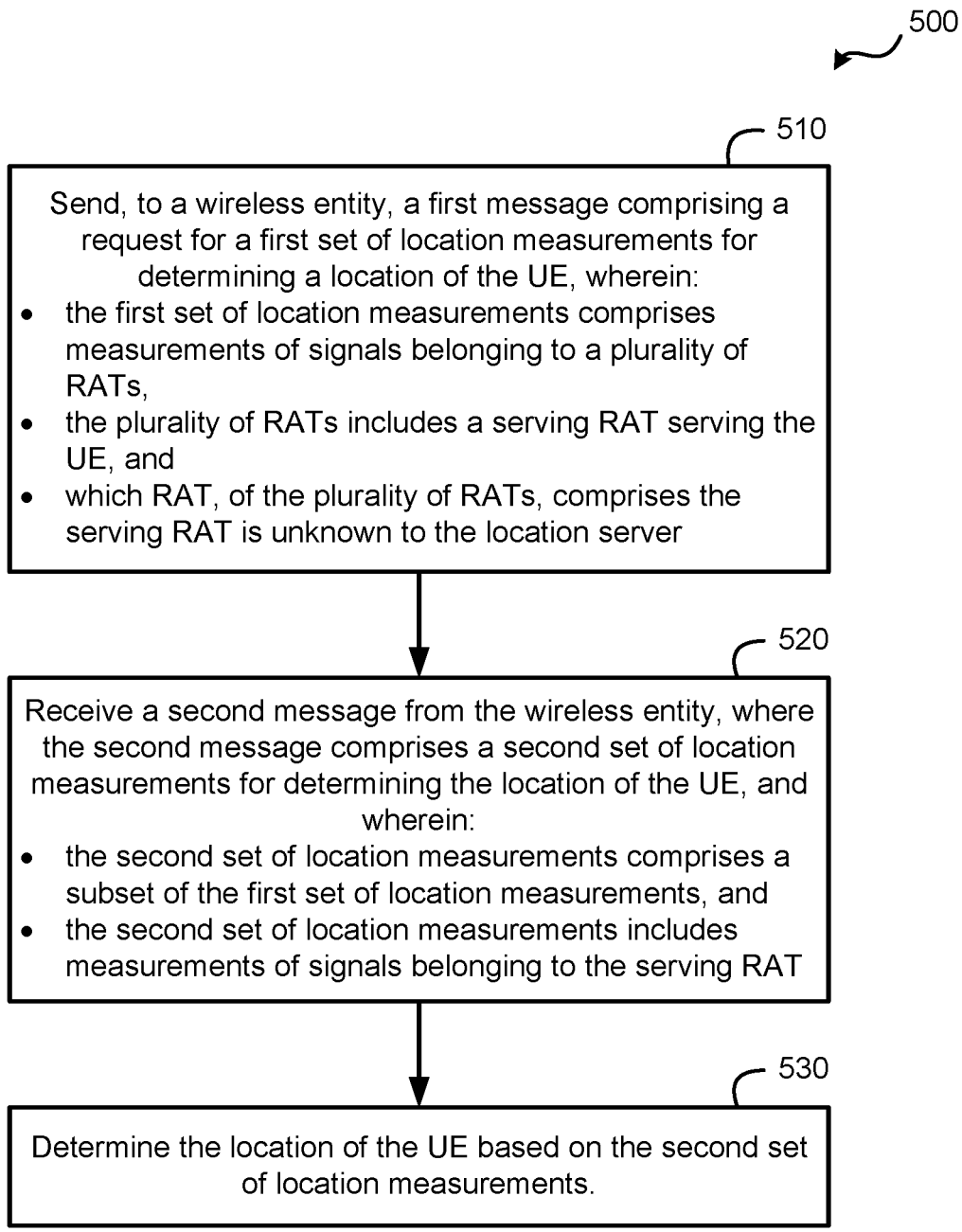
FIG. 5 is a flow diagram illustrating a method of locating a UE at a location server in a wireless network, according to an embodiment.

FIG. 5 is a flow diagram illustrating a method 500 of locating a UE (e.g. the UE 105) at a location server in a wireless network, according to an embodiment, which illustrates the functionality of a location server according to aspects of embodiments described above and illustrated in FIGS. 1-4. Thus, according to some embodiments, the functionality of one or more blocks illustrated in FIG. 5 may be performed by an LMF 120, such as the LMF 120 of the communication system 100 of FIG. 1, or by an E-SMLC or SLP. And because a location server may comprise a computer system, means for performing these functions may include software and/or hardware components of a computer system, such as the computer system illustrated in FIG. 9 and described in more detail below.

At block 510, the functionality includes sending, to a wireless entity, a first message comprising a request for a first set of location measurements for determining a location of the UE, where the first set of location measurements comprises measurements of signals belonging to a plurality of RATs, where the plurality of RATs includes a serving RAT serving the UE, and where which RAT, of the plurality of RATs, comprises the serving RAT is unknown to the location server. As noted above, this may occur in certain circumstances, such as when a location session is initiated between the location server and a UE and/or AN when the UE is accessing a first RAT, and when the UE subsequently accesses a second RAT during the location session. The plurality of RATs can comprise any of a variety of RATs, including, for example, a Fifth Generation (5G) New Radio (NR) RAT, a Long Term Evolution (LTE) RAT, an IEEE 802.11 WiFi RAT, a Bluetooth RAT, or some combination thereof. The functionality performed at block 510 may be performed for a UE assisted, UE based, or network-based positioning, depending on desired functionality. Accordingly, in some aspects, the functionality of block 510 may correspond to stage 210 of FIG. 2, stage 335 of FIG. 3 and/or stage 435 of FIG. 4.

For network based ECID, for example, the wireless entity may comprise a first access node for the wireless network for the serving RAT. In such instances, the first access node may comprise an NR NodeB (gNB, e.g. gNB 110) for an NR RAT, a next generation evolved Node B (ng-eNB, e.g. ng-eNB 114) for an LTE RAT, a wireless local area network (WLAN, e.g. WLAN 116) for an IEEE 802.11 WiFi RAT, or a WLAN (e.g. WLAN 116) for a Bluetooth RAT, according to some embodiments. For example, the first access node may comprise a serving gNB or a serving ng-eNB for the UE. For UE assisted or UE based positioning (e.g. using OTDOA or UE assisted ECID as in FIGS. 3 and 4), the wireless entity may comprise the UE.

Means for performing the functionality at block 510 may comprise one or more components of a computer system, such as a bus 905, processing unit(s) 910, communication subsystem 930, working memory 935, operating system 940, application(s) 945, and/or other components of the computer system 900 illustrated in FIG. 9 and described in more detail below.

At block 520, the functionality includes receiving a second message from the wireless entity, where the second message comprises a second set of location measurements for determining the location of the UE, where the second set of location measurements comprises a subset of the first set of location measurements, and where the second set of location measurements includes measurements of signals belonging to the serving RAT. For example, if the request for first set of location measurements at block 510 includes a request for measurements using NR, LTE and WiFi, the second set of location measurements received at block 520 may either include or only comprise measurements using LTE. Again, the functionality performed at block 520 may be performed for a UE assisted, UE based, or network-based positioning, depending on desired functionality. Accordingly, in some aspects, the functionality of block 520 may correspond to stage 240 and/or 280 in FIG. 2, stage 355 of FIG. 3, and/or stage 455 of FIG. 4.

In embodiments where the wireless entity comprises a first access node for the wireless network for the serving RAT (e.g. for network based ECID), the first message and/or the second message may comprise messages for an NR Positioning Protocol A (NRPPa). In some instances, in these embodiments, the first access node may take measurements of the UE (e.g. as at stage 230 and/or 270 in FIG. 2). The second set of location measurements may then comprise location measurements, obtained by the first access node, of signals transmitted by the UE using the serving RAT. In some of these embodiments, the location measurements obtained by the first access node may comprise at least one of a Received Signal Strength Indication (RSSI), Reference Signal Received Power (RSRP), Reference Signal Received Quality (RSRQ), Round Trip signal propagation Time (RTT), Angle Of Arrival (AOA), Receive-Transmit Time Difference (Rx-Tx), or some combination thereof. In some of these embodiments, the first access node may obtain measurements taken by the UE (e.g. as at stage 220 and/or 260 in FIG. 2). The second set of location measurements may then comprise location measurements, obtained by the UE, of signals transmitted by the first access node using the serving RAT, where the location measurements obtained by the UE are sent to the first access node by the UE. Here, according to some embodiments, the location measurements obtained by the UE may comprise at least one of a Received Signal Strength Indication (RSSI), Reference Signal Received Power (RSRP), Reference Signal Received Quality (RSRQ), Round Trip signal propagation Time (RTT), Angle Of Arrival (AOA), Angle of Departure (AoD), Receive-Transmit Time Difference (Rx-Tx), or some combination thereof. Additionally or alternatively in these embodiments, the second set of location measurements may comprise location measurements, obtained by the UE, of signals transmitted by a second access node using at least one of the plurality of RATs, where the second access node is different than the first access node, and where the location measurements obtained by the UE are sent to the first access node by the UE. Moreover, according to some embodiments, the at least one of the plurality of RATs used by the second access node may be different than the serving RAT used by the first access node.

In embodiments where the wireless entity comprises the UE (e.g. for UE assisted ECID or OTDOA), the first message and/or the second message may comprise messages for an LTE Positioning Protocol (LPP), an NR Positioning Protocol (NPP), or both protocols. In these embodiments, the UE may take measurements of signals transmitted by an access node for the wireless network for the serving RAT (e.g. as at stage 345 in FIG. 3 or stage 445 in FIG. 4). The second set of location measurements may then comprise location measurements obtained by the UE of signals transmitted by a first access node using the serving RAT. Here, the location measurements obtained by the UE may comprise at least one of a Received Signal Strength Indication (RSSI), Reference Signal Received Power (RSRP), Reference Signal Received Quality (RSRQ), Round Trip signal propagation Time (RTT), Angle Of Arrival (AOA), Angle of Departure (AoD), Receive-Transmit Time Difference (Rx-Tx), Reference Signal Time Difference (RSTD), Time Of Arrival (TOA), or some combination thereof. In some of these embodiments, the first access node may comprise an NR NodeB (gNB, e.g. gNB 110) for an NR RAT, a next generation evolved Node B (ng-eNB, e.g. ng-eNB 114) for an LTE RAT, a wireless local area network (WLAN, e.g. WLAN 116) for an IEEE 802.11 WiFi RAT, or a WLAN for a Bluetooth RAT. Additionally or alternatively, the first access node may comprise a serving gNB or a serving ng-eNB for the UE. In some of these embodiments, the UE may take measurements of signals transmitted by additional access nodes using the serving RAT (e.g. as described for OTDOA in FIG. 3, where UE 105 may measure signals transmitted by an access node supporting an OTDOA reference cell and other access nodes supporting OTDOA neighboring cells). The second set of location measurements may then comprise location measurements, obtained by the UE, of signals transmitted by a plurality of access nodes using the serving RAT. Here, the location measurements obtained by the UE may comprise at least one of a Time Of Arrival (TOA), a Reference Signal Time Difference (RSTD), or some combination thereof. In addition or instead, in these embodiments (e.g. as described for stage 445 in FIG. 4), the UE may obtain measurements from access nodes using a RAT or RATs different than the serving RAT of the first access node. Thus, the second set of location measurements may comprise location measurements, obtained by the UE, of signals transmitted by a plurality of access nodes using at least one of the plurality of RATs, where the at least one of the plurality of RATs is different than the serving RAT.

Means for performing the functionality at block 520 may comprise one or more components of a computer system, such as a bus 905, processing unit(s) 910, communication subsystem 930, working memory 935, operating system 940, application(s) 945, and/or other components of the computer system 900 illustrated in FIG. 9 and described in more detail below.

The functionality at block 530 comprises determining a location of the UE based on the second set of location measurements. Again, the functionality performed here may be performed for a UE assisted, UE based, or network-based positioning. Accordingly, in some aspects, the functionality of block 530 may correspond to stage 250 (and optionally stage 290) in FIG. 2, stage 360 of FIG. 3, and/or stage 460 of FIG. 4. Means for performing the functionality at block 530 may comprise one or more components of a computer system, such as a bus 905, processing unit(s) 910, working memory 935, operating system 940, application(s) 945, and/or other components of the computer system 900 illustrated in FIG. 9 and described in more detail below.

Figure 6:
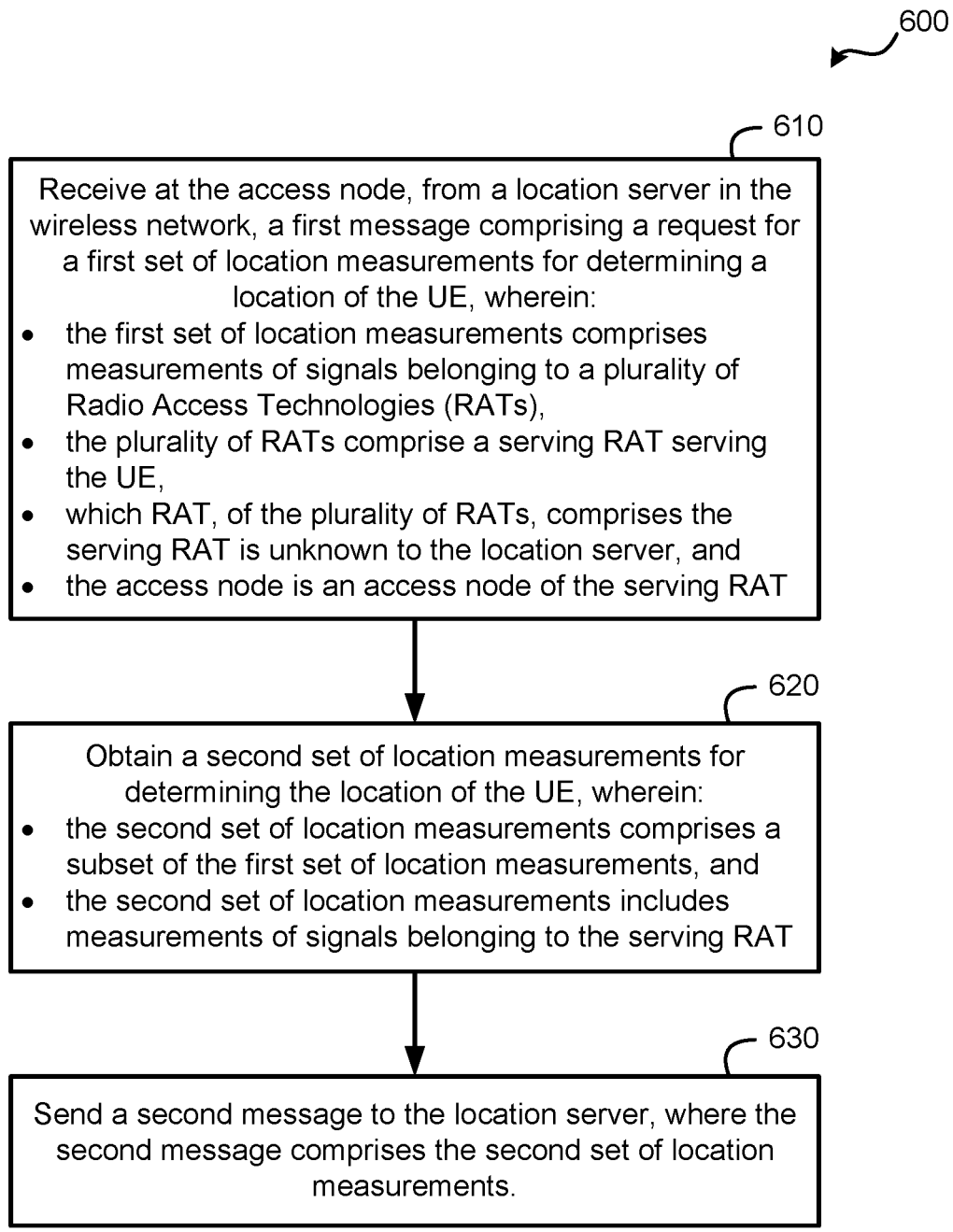
FIG. 6 is a flow diagram illustrating a method of locating a UE at an access node for a wireless network, according to an embodiment.

FIG. 6 is a flow diagram illustrating a method 600 of locating a UE (e.g. UE 105) at an access node for a wireless network, according to an embodiment, which illustrates the functionality of a base station and/or other types of access nodes according to aspects of embodiments described above and illustrated in FIGS. 1-4. Thus, according to some embodiments, the functionality of one or more blocks illustrated in FIG. 6 may be performed by a serving access node, such as a gNB (e.g. gNB 110), ng-eNB (e.g. ng-eNB 114), WLAN (e.g. WLAN 116), or N3IWF (e.g. N3IWF 150) as in FIG. 1, by AN 205 of FIG. 2, or AN1 205-1 of FIGS. 3 and 4. And because an access node may comprise a computer system, means for performing these functions may include software and/or hardware components of a computer system, such as the computer system illustrated in FIG. 9 and described in more detail below. Additionally or alternatively, means for performing these functions may include software and/or hardware components of an access node, such as the access node illustrated in FIG. 10 and described in more detail below.

At block 610, the functionality includes receiving, from a location server (e.g. LMF 120) in the wireless network, a first message comprising a request for a first set of location measurements for determining a location of the UE, where the first set of location measurements comprises measurements of signals belonging to a plurality of RATs, where the plurality of RATs comprise a serving RAT serving the UE, where which RAT, of the plurality of RATs, comprises the serving RAT is unknown to the location server, and where the access node is an access node of the serving RAT. The plurality of RATs can comprise any of a variety of RATs, including, for example, a Fifth Generation (5G) New Radio (NR) RAT, a Long Term Evolution (LTE) RAT, an IEEE 802.11 WiFi RAT, a Bluetooth RAT, or some combination thereof. In some instances, the access node may comprise an NR NodeB (gNB) for an NR RAT, a next generation evolved Node B (ng-eNB) for an LTE RAT, a wireless local area network (WLAN) for an IEEE 802.11 WiFi RAT, a WLAN for a Bluetooth RAT or a Non-3GPP Interworking Function (N3IWF). Additionally or alternatively, the access node may be a serving gNB or a serving ng-eNB for the UE. The functionality performed at block 610 may be performed for network-based positioning, depending on desired functionality. Accordingly, in some aspects, the functionality of block 610 may correspond to stage 210 in FIG. 2.

Means for performing the functionality at block 610 may comprise one or more components of a computer system, such as a bus 905, processing unit(s) 910, communication subsystem 930, working memory 935, operating system 940, application(s) 945, and/or other components of the computer system 900 illustrated in FIG. 9 and described in more detail below. Additionally or alternatively, means for performing the functionality at block 610 may comprise one or more components of an access node, such as a bus 1005, processing unit(s) 1010, wireless communication interface 1030, memory 1060, network interface 1080, and/or other components of the access node 1000 illustrated in FIG. 10 and described in more detail below.

At block 620, the functionality includes obtaining a second set of location measurements for determining the location of the UE, where the second set of location measurements comprises a subset of the first set of location measurements, and where the second set of location measurements includes measurements of signals belonging to the serving RAT. The functionality performed at block 620 may be performed for network-based positioning. Accordingly, in some aspects, the functionality of block 620 may correspond to stages 220, 230, 260, and/or 270 of FIG. 2.

Again, depending on desired functionality, the location information may include measurements taken by the access node (e.g. as at stage 230 and 270 in FIG. 2). Thus, according to some embodiments, obtaining the second set of location measurements at block 620 may comprise obtaining a third set of location measurements of signals for the serving RAT transmitted by the UE and including, in the second set of location measurements, the third set of location measurements. Here, according to some embodiments, the third set of location measurements may comprise at least one of a Received Signal Strength Indication (RSSI), Reference Signal Received Power (RSRP), Reference Signal Received Quality (RSRQ), Round Trip signal propagation Time (RTT), Angle Of Arrival (AOA), Receive-Transmit time difference (Rx-Tx), or some combination thereof.

In some embodiments, the location information may include measurements taken by the UE (e.g. as at stage 220 and 260 in FIG. 2). Thus, according to some embodiments, obtaining the second set of location measurements may comprise receiving, at the access node, location measurements, obtained by the UE, of signals transmitted by at least one access node using at least one of the plurality of RATs, and including, in the second set of location measurements, the location measurements obtained by the UE. In such instances, the at least one access node may comprise the access node and the at least one of the plurality of RATs may comprise the serving RAT. Alternatively, the at least one access node does not comprise the access node. In this latter case, according to some embodiments, the at least one of the plurality of RATs may not comprise the serving RAT. In some embodiments, obtaining measurements taken by the UE by the access node may involve a request and response interaction between the access node and UE (e.g. using an RRC protocol). Thus, according to some embodiments, receiving the location measurements obtained by the UE at the access node may be in response to the sending, to the UE, a request for the location measurements obtained by the UE. Additionally or alternatively, the location measurements obtained by the UE may comprise at least one of a Received Signal Strength Indication (RSSI), Reference Signal Received Power (RSRP), Reference Signal Received Quality (RSRQ), Round Trip signal propagation Time (RTT), Angle Of Arrival (AOA), Angle of Departure (AoD), Receive-Transmit time difference (Rx-Tx), Reference Signal Time Difference (RSTD), Time Of Arrival (TOA), or some combination thereof.

Means for performing the functionality at block 620 may comprise one or more components of a computer system, such as a bus 905, processing unit(s) 910, communication subsystem 930, working memory 935, operating system 940, application(s) 945, and/or other components of the computer system 900 illustrated in FIG. 9 and described in more detail below. Additionally or alternatively, means for performing the functionality at block 620 may comprise one or more components of an access node, such as a bus 1005, processing unit(s) 1010, wireless communication interface 1030, memory 1060, and/or other components of the access node 1000 illustrated in FIG. 10 and described in more detail below.

At block 630, the functionality includes sending a second message to the location server, where the second message comprises the second set of location measurements. In some embodiments, the first message and the second message may comprise messages for an NR Positioning Protocol A (NRPPa). Again, the functionality performed at block 630 may be performed for network-based positioning. Thus, in some aspects, the functionality of block 630 may correspond to stages 240 and 280 of FIG. 2.

Means for performing the functionality at block 630 may comprise one or more components of a computer system, such as a bus 905, processing unit(s) 910, communication subsystem 930, working memory 935, operating system 940, application(s) 945, and/or other components of the computer system 900 illustrated in FIG. 9 and described in more detail below. Additionally or alternatively, means for performing the functionality at block 630 may comprise one or more components of an access node, such as a bus 1005, processing unit(s) 1010, wireless communication interface 1030, memory 1060, network interface 1080, and/or other components of the access node 1000 illustrated in FIG. 10 and described in more detail below.

Figure 7:
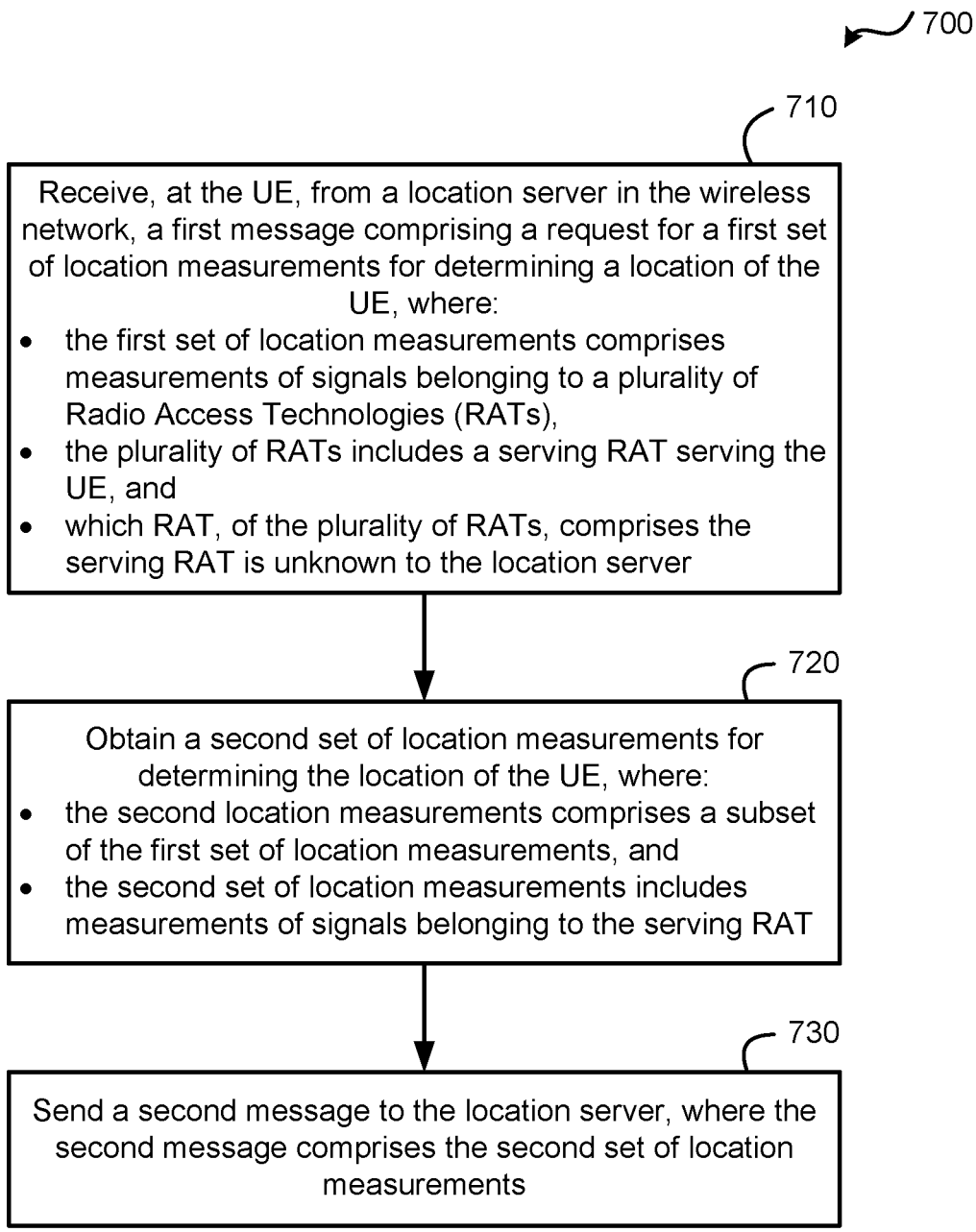
FIG. 7 is a flow diagram illustrating a method at a UE for providing location information, according to an embodiment.

FIG. 7 is a flow diagram illustrating a method 700 at a UE (e.g. the UE 105) for providing location information, according to an embodiment, which illustrates the functionality of a UE according to aspects of embodiments described above and illustrated in FIGS. 1-4. Means for performing these functions may include software and/or hardware components of a UE 105, such as the UE 105 illustrated in FIG. 8 and described in more detail below.

At block 710, the functionality includes receiving, from a location server (e.g. the LMF 120) in the wireless network, a first message comprising a request for a first set of location measurements for determining a location of the UE, where the first set of location measurements comprises measurements of signals belonging to a plurality of RATs, where the plurality of RATs includes a serving RAT serving the UE, and where which RAT, of the plurality of RATs, comprises the serving RAT is unknown to the location server. Again, the plurality of RATs can comprise any of a variety of RATs, including, for example, a Fifth Generation (5G) New Radio (NR) RAT, a Long Term Evolution (LTE) RAT, an IEEE 802.11 WiFi RAT, a Bluetooth RAT, or some combination thereof. The functionality performed at block 710 may be performed for UE assisted or UE based positioning, depending on desired functionality. Accordingly, in some aspects, the functionality of block 710 may correspond to stage 335 of FIG. 3 and/or stage 435 of FIG. 4.

Means for performing the functionality at block 710 may comprise one or more components of a UE, such as a bus 805, processing unit(s) 810, wireless communication interface 830, memory 860, and/or other components of the UE 105 illustrated in FIG. 8 and described in more detail below.

At block 720, the functionality includes obtaining a second set of location measurements for determining the location of the UE, where the second set of location measurements comprises a subset of the first set of location measurements, and where the second set of location measurements includes measurements of signals belonging to the serving RAT. The functionality performed at block 720 may be performed for UE assisted or UE based positioning, depending on desired functionality. Accordingly, in some aspects, the functionality of block 720 may correspond to stage 345 and/or stage 350 of FIG. 3, and/or to stage 445 and/or stage 450 of FIG. 4.

For UE assisted or UE based ECID or OTDOA, obtaining the second set of location measurements may comprise obtaining a third set of location measurements of signals transmitted by at least one access node using at least one of the plurality of RATs and including, in the second set of location measurements, the third set of location measurements. In such instances, the third set of location measurements may comprise at least one of a Received Signal Strength Indication (RSSI), Reference Signal Received Power (RSRP), Reference Signal Received Quality (RSRQ), Round Trip signal propagation Time (RTT), Angle Of Arrival (AOA), Angle of Departure (AOD), Receive-Transmit time difference (Rx-Tx), Reference Signal Time Difference (RSTD), Time of Arrival (TOA), or some combination thereof. Additionally or alternatively, the at least one access node may comprise an NR NodeB (e.g. gNB 110) for an NR RAT, a next generation evolved Node B (e.g. ng-eNB 114) for an LTE RAT, a wireless local area network (e.g. WLAN 116) for an IEEE 802.11 WiFi RAT, or a WLAN for a Bluetooth RAT. Moreover, according to some embodiments the at least one of the plurality of RATs may comprise the serving RAT. Additionally or alternatively, the at least one access node may comprise a serving gNB (e.g. gNB 110) or a serving ng-eNB (e.g. ng-eNB 114) for the UE. Moreover, according to some embodiments, the at least one of the plurality of RATs is different than the serving RAT.

The at least one access node may comprise a plurality of access nodes. According to some embodiments, the third set of location measurements may then comprise at least one of a Time Of Arrival (TOA), a Reference Signal Time Difference (RSTD), or some combination thereof.

Means for performing the functionality at block 720 may comprise one or more components of a UE, such as a bus 805, processing unit(s) 810, wireless communication interface 830, memory 860, and/or other components of the UE 105 illustrated in FIG. 8 and described in more detail below.

At block 730, the functionality includes sending a second message to the location server, where the second message comprises the second set of location measurements. In some embodiments, the first message and the second message may comprise messages for an LTE Positioning Protocol (LPP), an NR Positioning Protocol (NPP), or both protocols. Again, the functionality performed at block 710 may be performed for UE assisted or UE based positioning, depending on desired functionality. Thus, in some aspects, the functionality of block 730 may correspond to stage 355 of FIG. 3, and/or stage 455 of FIG. 4.

Means for performing the functionality at block 730 may comprise one or more components of components of a UE, such as a bus 805, processing unit(s) 810, wireless communication interface 830, memory 860, and/or other components of the UE 105 illustrated in FIG. 8 and described in more detail below.

Figure 8:
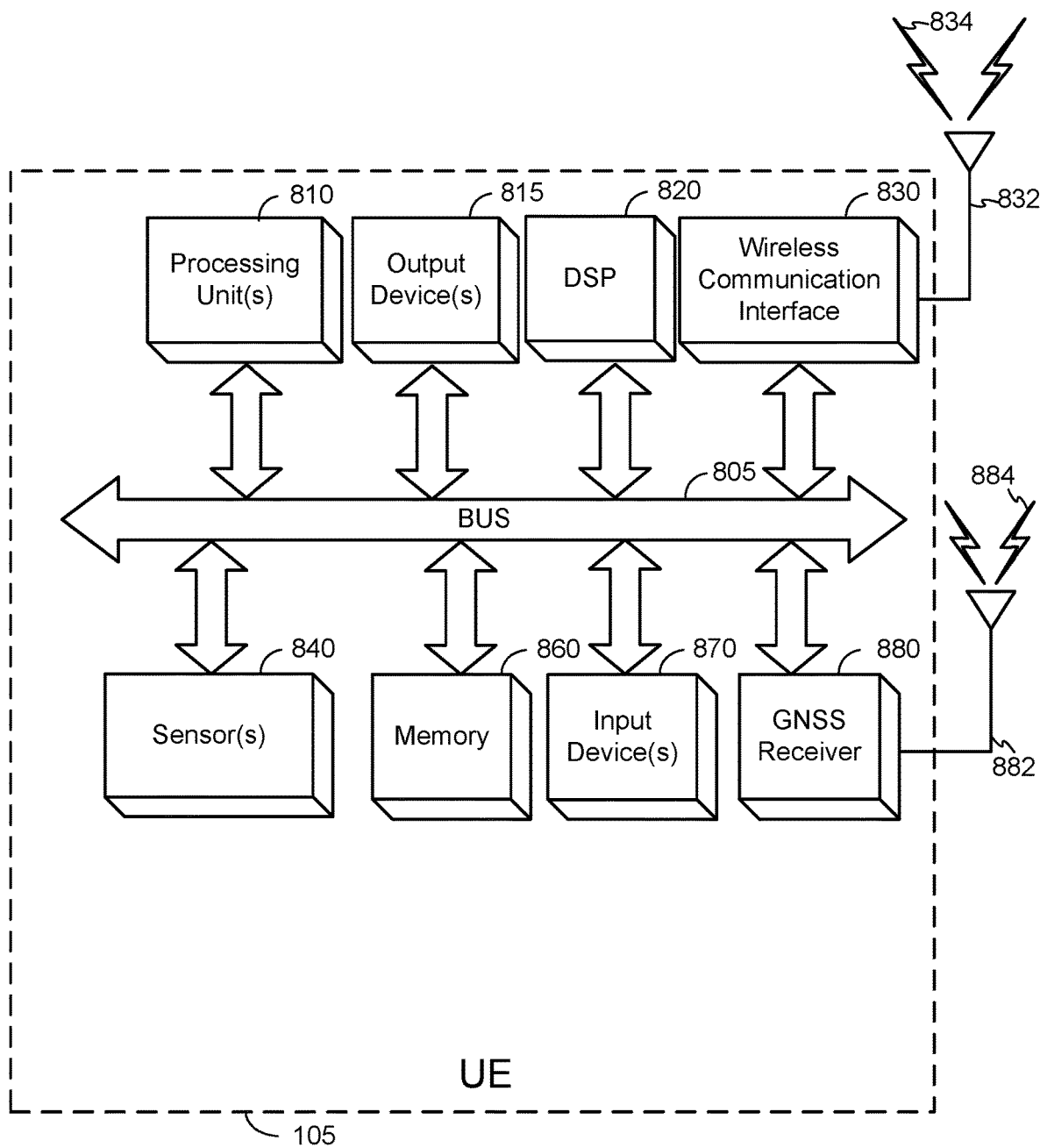
FIG. 8 is a block diagram of an embodiment of a UE.

FIG. 8 illustrates an embodiment of a UE 105, which can be utilized as described herein above (e.g. in association with FIGS. 1-4). For example, the UE 105 can perform one or more of the functions of method 700 of FIG. 7. It should be noted that FIG. 8 is meant only to provide a generalized illustration of various components, any or all of which may be utilized as appropriate. It can be noted that, in some instances, components illustrated by FIG. 8 can be localized to a single physical device and/or distributed among various networked devices, which may be disposed at different physical locations (e.g., located at different parts of a user's body, in which case the components may be communicatively connected via a Personal Area Network (PAN) and/or other means).

The UE 105 is shown comprising hardware elements that can be electrically coupled via a bus 805 (or may otherwise be in communication, as appropriate). The hardware elements may include a processing unit(s) 810 which can include without limitation one or more general-purpose processors, one or more special-purpose processors (such as digital signal processing (DSP) chips, graphics acceleration processors, application specific integrated circuits (ASICs), and/or the like), and/or other processing structure or means. As shown in FIG. 8, some embodiments may have a separate Digital Signal Processor (DSP) 820, depending on desired functionality. Location determination and/or other determinations based on wireless communication may be provided in the processing unit(s) 810 and/or wireless communication interface 830 (discussed below). The UE 105 also can include one or more input devices 870, which can include without limitation a keyboard, touch screen, a touch pad, microphone, button(s), dial(s), switch(es), and/or the like; and one or more output devices 815, which can include without limitation a display, light emitting diode (LED), speakers, and/or the like.

The UE 105 may also include a wireless communication interface 830, which may comprise without limitation a modem, a network card, an infrared communication device, a wireless communication device, and/or a chipset (such as a Bluetooth® device, an IEEE 802.11 device, an IEEE 802.15.4 device, a WiFi device, a WiMax device, cellular communication facilities, etc.), and/or the like, which may enable the UE 105 to communicate via the networks described above with regard to FIG. 1. The wireless communication interface 830 may permit data and signaling to be communicated (e.g. transmitted and received) with a network, eNBs, gNBs, ng-eNBs, and/or other access node types, and/or other network components, computer systems, and/or any other electronic devices described herein. The communication can be carried out via one or more wireless communication antenna(s) 832 that send and/or receive wireless signals 834.

Depending on desired functionality, the wireless communication interface 830 may comprise separate transceivers to communicate with base stations (e.g., ng-eNBs and gNBs) and other terrestrial transceivers, such as wireless devices and access points. The UE 105 may communicate with different data networks that may comprise various network types. For example, a Wireless Wide Area Network (WWAN) may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a WiMax (IEEE 802.16) network, and so on. A CDMA network may implement one or more radio access technologies (RATs) such as cdma2000, Wideband CDMA (WCDMA), and so on. Cdma2000 includes IS-95, IS-2000, and/or IS-856 standards. A TDMA network may implement GSM, Digital Advanced Mobile Phone System (D-AMPS), or some other RAT. An OFDMA network may employ LTE, LTE Advanced, 5G NR, and so on. 5G NR, LTE, LTE Advanced, GSM, and WCDMA are described in documents from the Third Generation Partnership Project (3GPP). Cdma2000 is described in documents from a consortium named "3rd Generation Partnership Project 2" (3GPP2). 3GPP and 3GPP2 documents are publicly available. A wireless local area network (WLAN) may also be an IEEE 802.11x network, and a wireless personal area network (WPAN) may be a Bluetooth network, an IEEE 802.15x, or some other type of network. The techniques described herein may also be used for any combination of WWAN, WLAN and/or WPAN.

The UE 105 can further include sensor(s) 840. Sensors 840 may comprise, without limitation, one or more inertial sensors and/or other sensors (e.g., accelerometer(s), gyroscope(s), camera(s), magnetometer(s), altimeter(s), microphone(s), proximity sensor(s), light sensor(s), barometer(s), and the like), some of which may be used to complement and/or facilitate the position determination described herein, in some instances.

Embodiments of the UE 105 may also include a GNSS receiver 880 capable of receiving signals 884 from one or more GNSS satellites (e.g., SVs 190) using an antenna 882 (which could be the same as antenna 832). Positioning based on GNSS signal measurement can be utilized to complement and/or incorporate the techniques described herein. The GNSS receiver 880 can extract a position of the UE 105, using conventional techniques, from GNSS SVs of a GNSS system (e.g., SVs 190 of FIG. 1), such as Global Positioning System (GPS), Galileo, Glonass, Quasi-Zenith Satellite System (QZSS) over Japan, Indian Regional Navigational Satellite System (IRNSS) over India, Beidou over China, and/or the like. Moreover, the GNSS receiver 880 can be used with various augmentation systems (e.g., a Satellite Based Augmentation System (SBAS)) that may be associated with or otherwise enabled for use with one or more global and/or regional navigation satellite systems, such as, e.g., WAAS, EGNOS, Multi-functional Satellite Augmentation System (MSAS), and Geo Augmented Navigation system (GAGAN), and/or the like.

The UE 105 may further include and/or be in communication with a memory 860. The memory 860 can include, without limitation, local and/or network accessible storage, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like.

The memory 860 of the UE 105 also can comprise software elements (not shown in FIG. 8), including an operating system, device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the method(s) discussed above may be implemented as code and/or instructions in memory 860 that are executable by the UE 105 (and/or processing unit(s) 810 or DSP 820 within UE 105). In an aspect, then, such code and/or instructions can be used to configure and/or adapt a general purpose computer (or other device) to perform one or more operations in accordance with the described methods.

Figure 9:
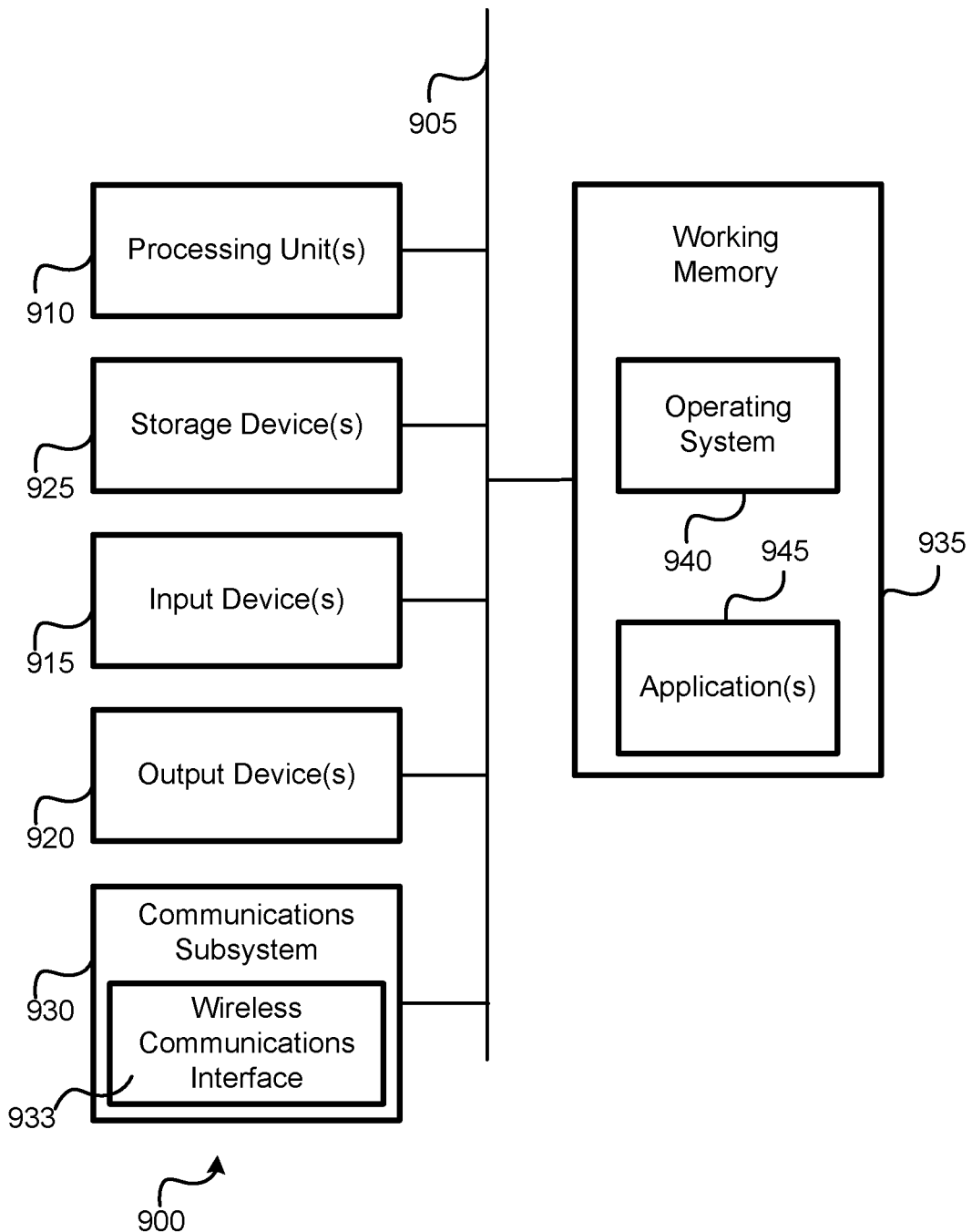
FIG. 9 is a block diagram of an embodiment of a computer system.

FIG. 9 illustrates an embodiment of a computer system 900, which may be utilized and/or incorporated into one or more components of a communication system (e.g., communication system 100 of FIG. 1), including various components of a 5G network, such as the NG-RAN 135, 5GCN 140, and/or similar components of other network types. FIG. 9 provides a schematic illustration of one embodiment of a computer system 900 that can perform the methods provided by various other embodiments, such as the methods described in relation to FIGS. 1-6. It should be noted that FIG. 9 is meant only to provide a generalized illustration of various components, any or all of which may be utilized as appropriate. FIG. 9, therefore, broadly illustrates how individual system elements may be implemented in a relatively separated or relatively more integrated manner. In addition, it can be noted that components illustrated by FIG. 9 can be localized to a single device and/or distributed among various networked devices, which may be disposed at different physical or geographical locations. In some embodiments, the computer system 900 may correspond to an LMF 120, a gNB 110 (e.g. gNB 110-1), an ng-eNB 114, a WLAN 116, an eNB, another cellular or non-cellular access node, an E-SMLC, a SUPL SLP and/or some other type of location-capable device.

The computer system 900 is shown comprising hardware elements that can be electrically coupled via a bus 905 (or may otherwise be in communication, as appropriate). The hardware elements may include processing unit(s) 910, which can include without limitation one or more general-purpose processors, one or more special-purpose processors (such as digital signal processing chips, graphics acceleration processors, and/or the like), and/or other processing structure, which can be configured to perform one or more of the methods described herein, including the method described in relation to FIG. 9. The computer system 900 also can include one or more input devices 915, which can include without limitation a mouse, a keyboard, a camera, a microphone, and/or the like; and one or more output devices 920, which can include without limitation a display device, a printer, and/or the like.

The computer system 900 may further include (and/or be in communication with) one or more non-transitory storage devices 925, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like.

The computer system 900 may also include a communications subsystem 930, which can include support of wireline communication technologies and/or wireless communication technologies (in some embodiments) managed and controlled by a wireless communication interface 933. The communications subsystem 930 may include a modem, a network card (wireless or wired), an infrared communication device, a wireless communication device, and/or a chipset, and/or the like. The communications subsystem 930 may include one or more input and/or output communication interfaces, such as the wireless communication interface 933, to permit data and signaling to be exchanged with a network, mobile devices, other computer systems, and/or any other electronic devices described herein. Note that the terms "mobile device" and "UE" are used interchangeably herein to refer to any mobile communications device such as, but not limited to, mobile phones, smartphones, wearable devices, mobile computing devices (e.g., laptops, PDAs, tablets), embedded modems, and automotive and other vehicular computing devices.

In many embodiments, the computer system 900 will further comprise a working memory 935, which can include a RAM and/or or ROM device. Software elements, shown as being located within the working memory 935, can include an operating system 940, device drivers, executable libraries, and/or other code, such as application(s) 945, which may comprise computer programs provided by various embodiments, and/or may be designed to implement methods, and/or configure systems, provided by other embodiments, as described herein. Merely by way of example, one or more procedures described with respect to the method(s) discussed above, such as the method described in relation to FIG. 9, may be implemented as code and/or instructions that are stored (e.g. temporarily) in working memory 935 and are executable by a computer (and/or a processing unit within a computer such as processing unit(s) 910); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the storage device(s) 925 described above. In some cases, the storage medium might be incorporated within a computer system, such as computer system 900. In other embodiments, the storage medium might be separate from a computer system (e.g., a removable medium, such as an optical disc), and/or provided in an installation package, such that the storage medium can be used to program, configure, and/or adapt a general purpose computer with the instructions/code stored thereon. These instructions might take the form of executable code, which is executable by the computer system 900 and/or might take the form of source and/or installable code, which, upon compilation and/or installation on the computer system 900 (e.g., using any of a variety of generally available compilers, installation programs, compression/decompression utilities, etc.), then takes the form of executable code.

Figure 10:
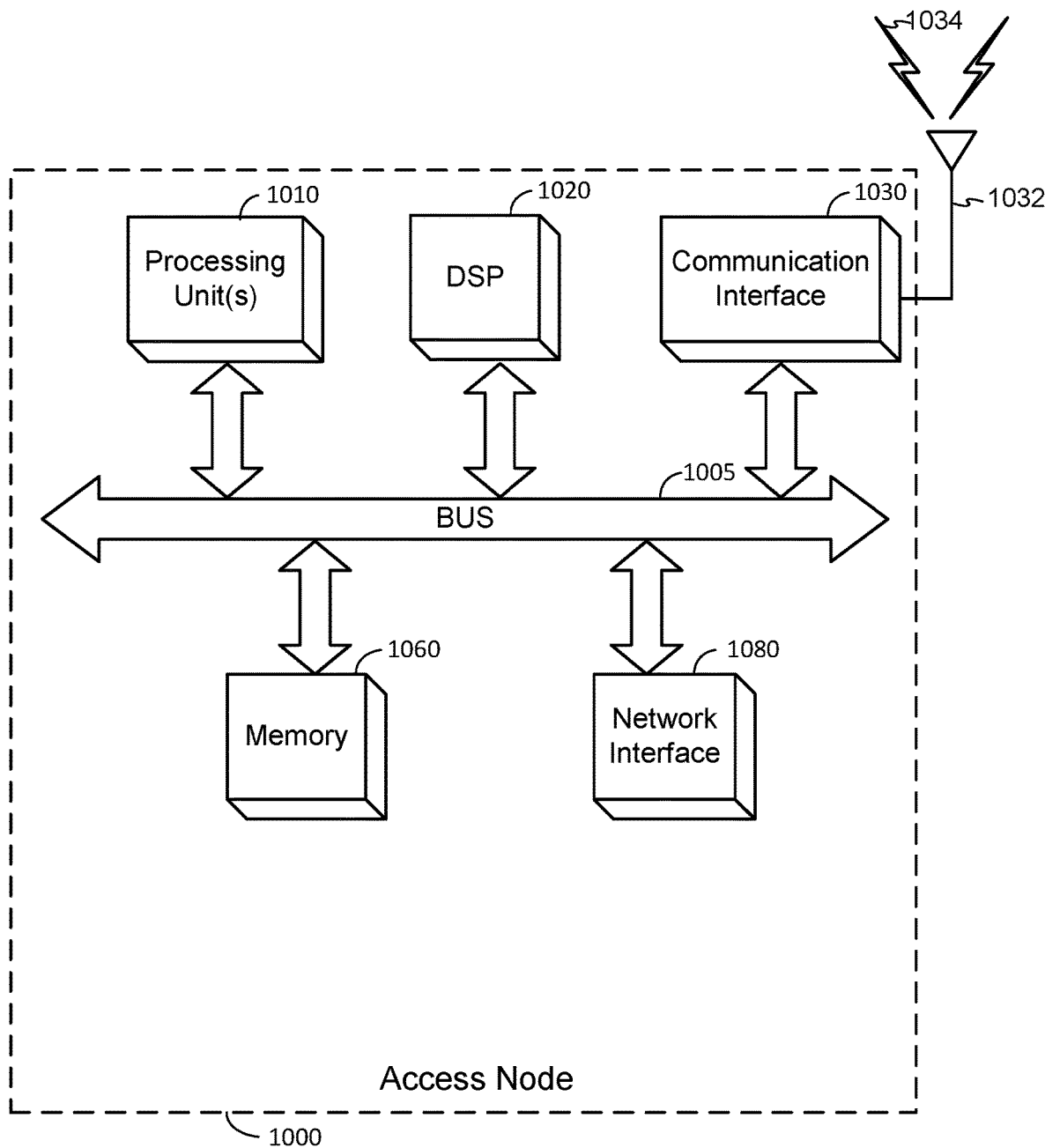
FIG. 10 is a block diagram of an embodiment of a base station.

FIG. 10 illustrates an embodiment of an access node 1000, which can be utilized as described herein above (e.g., in association with FIGS. 1-6). For example, the access node 1000 can perform one or more of the functions of method 600 of FIG. 6. It should be noted that FIG. 10 is meant only to provide a generalized illustration of various components, any or all of which may be utilized as appropriate. In some embodiments, the access node 1000 may correspond to a gNB 110, an ng-eNB 114, an eNB, a WLAN 116 or an N3IWF 150 as described herein above.

The access node 1000 is shown comprising hardware elements that can be electrically coupled via a bus 1005 (or may otherwise be in communication, as appropriate). The hardware elements may include a processing unit(s) 1010 which can include without limitation one or more general-purpose processors, one or more special-purpose processors (such as DSP chips, graphics acceleration processors, ASICs, and/or the like), and/or other processing structure or means. As shown in FIG. 10, some embodiments may have a separate DSP 1020, depending on desired functionality. Location determination and/or other determinations based on wireless communication may be provided in the processing unit(s) 1010 and/or wireless communication interface 1030 (discussed below), according to some embodiments. The access node 1000 also can include one or more input devices, which can include without limitation a keyboard, display, mouse, microphone, button(s), dial(s), switch(es), and/or the like; and one or more output devices, which can include without limitation a display, light emitting diode (LED), speakers, and/or the like.

The access node 1000 might also include a wireless communication interface 1030, which may comprise without limitation a modem, a network card, an infrared communication device, a wireless communication device, and/or a chipset (such as a Bluetooth® device, an IEEE 802.11 device, an IEEE 802.15.4 device, a WiFi device, a WiMAX device, cellular communication facilities, etc.), and/or the like, which may enable the access node 1000 to communicate as described herein. The wireless communication interface 1030 may permit data and signaling to be communicated (e.g. transmitted and received) to and from UEs, other access nodes (e.g., eNBs, gNBs, and ng-eNBs), and/or other network components, computer systems, and/or any other electronic devices described herein. The communication can be carried out via one or more wireless communication antenna(s) 1032 that send and/or receive wireless signals 1034.

The access node 1000 may also include a network interface 1080, which can include support of wireline communication technologies. The network interface 1080 may include a modem, network card, chipset, and/or the like. The network interface 1080 may include one or more input and/or output communication interfaces to permit data to be exchanged with a network, communication network servers, computer systems, and/or any other electronic devices described herein. For example, network interface 1080 may support communication with LMF 120.

In many embodiments, the access node 1000 will further comprise a memory 1060. The memory 1060 can include, without limitation, local and/or network accessible storage, a disk drive, a drive array, an optical storage device, a solid-state storage device, such as a RAM, and/or a ROM, which can be programmable, flash-updateable, and/or the like. Such storage devices may be configured to implement any appropriate data stores, including without limitation, various file systems, database structures, and/or the like.

The memory 1060 of the access node 1000 also can comprise software elements (not shown in FIG. 10), including an operating system, device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the method(s) discussed above may be implemented as code and/or instructions in memory 1060 that are executable by the access node 1000 (and/or processing unit(s) 1010 or DSP 1020 within access node 1000). In an aspect, then, such code and/or instructions can be used to configure and/or adapt a general purpose computer (or other device) to perform one or more operations in accordance with the described methods.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

With reference to the appended figures, components that can include memory can include non-transitory machine-readable media. The term "machine-readable medium" and "computer-readable medium" as used herein, refer to any storage medium that participates in providing data that causes a machine to operate in a specific fashion. In embodiments provided hereinabove, various machine-readable media might be involved in providing instructions/code to processing units and/or other device(s) for execution. Additionally or alternatively, the machine-readable media might be used to store and/or carry such instructions/code. In many implementations, a computer-readable medium is a physical and/or tangible storage medium. Such a medium may take many forms, including but not limited to, non-volatile media, volatile media, and transmission media. Common forms of computer-readable media include, for example, magnetic and/or optical media, punchcards, papertape, any other physical medium with patterns of holes, a RAM, a PROM, EPROM, a FLASH-EPROM, any other memory chip or cartridge, a carrier wave as described hereinafter, or any other medium from which a computer can read instructions and/or code.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus, many of the elements are examples that do not limit the scope of the disclosure to those specific examples.

It has proven convenient at times, principally for reasons of common usage, to refer to such signals as bits, information, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that throughout this Specification discussions utilizing terms such as "processing," "computing," "calculating," "determining," "ascertaining," "identifying," "associating," "measuring," "performing," or the like refer to actions or processes of a specific apparatus, such as a special purpose computer or a similar special purpose electronic computing device. In the context of this Specification, therefore, a special purpose computer or a similar special purpose electronic computing device is capable of manipulating or transforming signals, typically represented as physical electronic, electrical, or magnetic quantities within memories, registers, or other information storage devices, transmission devices, or display devices of the special purpose computer or similar special purpose electronic computing device.

Terms, "and" and "or" as used herein, may include a variety of meanings that also is expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AA, AAB, AABBCCC, etc.

Having described several embodiments, various modifications, alternative constructions, and equivalents may be used without departing from the spirit of the disclosure. For example, the above elements may merely be a component of a larger system, wherein other rules may take precedence over or otherwise modify the application of the various embodiments. Also, a number of steps may be undertaken before, during, or after the above elements are considered. Accordingly, the above description does not limit the scope of the disclosure.

What is claimed is:

1. A method of locating a user equipment (UE) at a location server in a wireless network, the method comprising:
   sending, to a wireless entity, a first message comprising a request for a first set of location measurements for determining a location of the UE, wherein:
      the first set of location measurements comprises measurements of signals belonging to a plurality of Radio Access Technologies (RATs),
      the plurality of RATs includes a serving RAT serving the UE, and
      which RAT, of the plurality of RATs, comprises the serving RAT is unknown to the location server;
   receiving a second message from the wireless entity, the second message comprising a second set of location measurements for determining the location of the UE, wherein:
      the second set of location measurements comprises a subset of the first set of location measurements, and
      the second set of location measurements includes measurements of signals belonging to the serving RAT; and
   determining the location of the UE based on the second set of location measurements.

2. The method of claim 1, wherein the plurality of RATs comprises a Fifth Generation (5G) New Radio (NR) RAT, a Long Term Evolution (LTE) RAT, an IEEE 802.11 WiFi RAT, a Bluetooth RAT, or any combination thereof.

3. The method of claim 2, wherein the wireless entity comprises a first access node for the wireless network for the serving RAT.

4. The method of claim 3, wherein the first message and the second message comprise messages for an NR Positioning Protocol A (NRPPa).

5. The method of claim 3, wherein:
   the second set of location measurements comprise location measurements, obtained by the UE, of signals transmitted by the first access node using the serving RAT, and
   the location measurements obtained by the UE are sent to the first access node by the UE.

6. The method of claim 3, wherein:
   the second set of location measurements comprise location measurements, obtained by the UE, of signals transmitted by a second access node using at least one of the plurality of RATs,
   the second access node is different than the first access node, and
   the location measurements obtained by the UE are sent to the first access node by the UE.

7. A server for locating a user equipment (UE) in a wireless network, the server comprising:
   a communication interface;
   a memory; and
   one or more processing units communicatively coupled with the memory and the communication interface, wherein the one or more processing units are configured to cause the server to:
      send, via the communication interface to a wireless entity, a first message comprising a request for a first set of location measurements for determining a location of the UE, wherein:
         the first set of location measurements comprises measurements of signals belonging to a plurality of Radio Access Technologies (RATs),
         the plurality of RATs includes a serving RAT serving the UE, and
         which RAT, of the plurality of RATs, comprises the serving RAT is unknown to the server;
      receive, via the communication interface, a second message from the wireless entity, the second message comprising a second set of location measurements for determining the location of the UE, wherein:
         the second set of location measurements comprises a subset of the first set of location measurements, and
         the second set of location measurements includes measurements of signals belonging to the serving RAT; and
      determine the location of the UE based on the second set of location measurements.

8. The server of claim 7, wherein the plurality of RATs comprises a Fifth Generation (5G) New Radio (NR) RAT, a Long Term Evolution (LTE) RAT, an IEEE 802.11 WiFi RAT, a Bluetooth RAT, or any combination thereof.

9. The server of claim 8, wherein the wireless entity comprises a first access node for the wireless network for the serving RAT.

10. The server of claim 9, wherein the first message and the second message comprise messages for an NR Positioning Protocol A (NRPPa).

11. The server of claim 9, wherein:
   the second set of location measurements comprise location measurements, obtained by the UE, of signals transmitted by the first access node using the serving RAT, and the location measurements obtained by the UE are sent to the first access node by the UE.

12. The server of claim 9, wherein:

the second set of location measurements comprise location measurements, obtained by the UE, of signals transmitted by a second access node using at least one of the plurality of RATs, the second access node is different than the first access node, and the location measurements obtained by the UE are sent to the first access node by the UE.

* * * * *